US010822545B2

(12) United States Patent
Urade et al.

(10) Patent No.: US 10,822,545 B2
(45) Date of Patent: Nov. 3, 2020

(54) CONVERSION OF BIOMASS INTO A LIQUID HYDROCARBON MATERIAL

(71) Applicant: SHELL OIL COMPANY, Houston, TX (US)

(72) Inventors: Vikrant Nanasaheb Urade, Bengaluru (IN); Laxmi Narasimhan Chilkoor Soundararajan, Bengaluru (IN); Madhusudhan Rao Panchagnula, Bengaluru (IN); Alan Anthony Del Paggio, Spring, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 16/301,825

(22) PCT Filed: May 23, 2017

(86) PCT No.: PCT/EP2017/062395
§ 371 (c)(1),
(2) Date: Nov. 15, 2018

(87) PCT Pub. No.: WO2017/202837
PCT Pub. Date: Nov. 30, 2017

(65) Prior Publication Data
US 2019/0153324 A1  May 23, 2019

(30) Foreign Application Priority Data

May 25, 2016 (IN) .............................. 201641017931

(51) Int. Cl.
| C10G 1/06 | (2006.01) |
| C10G 1/00 | (2006.01) |
| C10G 3/00 | (2006.01) |
| B01J 31/02 | (2006.01) |
| B01J 31/04 | (2006.01) |
| C10G 1/10 | (2006.01) |
| B01J 27/19 | (2006.01) |
| B01J 31/34 | (2006.01) |
(Continued)

(52) U.S. Cl.
CPC .............. *C10G 1/002* (2013.01); *B01J 27/19* (2013.01); *B01J 31/02* (2013.01); *B01J 31/0209* (2013.01); *B01J 31/0237* (2013.01); *B01J 31/0247* (2013.01); *B01J 31/04* (2013.01); *B01J 31/34* (2013.01); *B01J 37/024* (2013.01); *B01J 37/0205* (2013.01); *B01J 37/0236* (2013.01); *B01J 37/08* (2013.01); *B01J 37/20* (2013.01); *C01B 3/48* (2013.01); *C10G 1/06* (2013.01); *C10G 1/10* (2013.01); *C10G 3/45* (2013.01); *C10G 3/46* (2013.01); *C10G 3/47* (2013.01); *C10G 3/48* (2013.01); *C10G 3/50* (2013.01); *C01B 2203/0205* (2013.01); *C01B 2203/0283* (2013.01); *C01B 2203/0485* (2013.01); *C01B 2203/062* (2013.01); *C01B 2203/1241* (2013.01); *C10G 2300/1014* (2013.01); *C10G 2400/20* (2013.01); *Y02P 30/20* (2015.11)

(58) Field of Classification Search
CPC ........ B01J 27/19; B01J 31/02; B01J 31/0209; B01J 31/0237; B01J 31/0247; B01J 31/04; B01J 31/34; B01J 37/0205; B01J 37/0236; B01J 37/024; B01J 37/08; B01J 37/20; C01B 2203/0205; C01B 2203/0283; C01B 2203/0485; C01B 2203/062; C01B 2203/1241; C01B 3/48; C10G 1/002; C10G 1/06; C10G 1/10; C10G 2300/1014; C10G 2400/20; C10G 3/45; C10G 3/46; C10G 3/47; C10G 3/48; C10G 3/50; Y02P 30/20
See application file for complete search history.

(56) References Cited

U.S. PATENT DOCUMENTS

| 5,961,786 A | 10/1999 | Freel et al. | |
| 2015/0306575 A1* | 10/2015 | Mandan | B01J 35/023 201/2.5 |

(Continued)

FOREIGN PATENT DOCUMENTS

| CA | 1283880 C | 5/1991 |
| CN | 102492455 A | 6/2012 |
(Continued)

OTHER PUBLICATIONS

International Search Report and Written Opinion received for PCT Patent Application No. PCT/EP2017/062395, dated Aug. 7, 2017, 10 pages.

(Continued)

*Primary Examiner* — Sharon Pregler

(57) ABSTRACT

A process for producing liquid hydrocarbon products from a biomass feedstock is provided. The process comprises:
contacting the feedstock with one or more hydropyrolysis catalyst compositions and molecular hydrogen to produce a product stream comprising hydropyrolysis product that is at least partially deoxygenated;
hydroconverting said hydropyrolysis product in the presence of one or more hydroconversion catalyst compositions to produce a vapour phase product comprising substantially fully deoxygenated hydrocarbon product,
wherein one or both of the hydropyrolysis catalyst composition and the hydroconversion catalyst composition is produced in a process comprising incorporating one or more metals selected from those of groups 6, 9, and 10 of the periodic table, into a shaped support; and incorporating one or more coordinating organic compounds into said shaped support, thus forming a catalyst precursor; and then either (i) treating the catalyst precursor in the presence of hydrogen and sulfiding it or (ii) calcining the catalyst precursor.

19 Claims, 7 Drawing Sheets

(51) Int. Cl.
    *B01J 37/02*    (2006.01)
    *B01J 37/08*    (2006.01)
    *B01J 37/20*    (2006.01)
    *C01B 3/48*     (2006.01)

(56) References Cited

U.S. PATENT DOCUMENTS

2017/0114283 A1*   4/2017  Urade .................... C10G 1/10
2018/0245000 A1    8/2018  Urade et al.

FOREIGN PATENT DOCUMENTS

| | | |
|---|---|---|
| CN | 103962173 A | 8/2014 |
| EP | 1016704 A2 | 7/2000 |
| WO | 2010107908 A1 | 9/2010 |
| WO | 2010117437 A1 | 10/2010 |
| WO | 2011056918 A1 | 5/2011 |
| WO | 2012021386 A1 | 2/2012 |
| WO | 2012021387 A2 | 2/2012 |
| WO | 2012021389 A1 | 2/2012 |
| WO | 2013086453 A1 | 6/2013 |
| WO | 2015114008 A1 | 8/2015 |
| WO | 2016001134 A1 | 1/2016 |
| WO | 2016001170 A1 | 1/2016 |

OTHER PUBLICATIONS

Bridgwater, "Biomass Fast Pyrolysis", Thermal Science, vol. 8, Issue No. 2, 2004, pp. 21-49.

* cited by examiner

CONVERSION OF BIOMASS INTO A LIQUID HYDROCARBON MATERIAL

PRIORITY CLAIM

The present application is the National Stage (§ 371) of International Application No. PCT/EP2017/062395, filed 23 May 2017, which claims priority from Indian Application No. 201641017931, filed 25 May 2016 incorporated herein by reference.

FIELD OF THE INVENTION

The invention relates to a process for converting a biomass, biomass-containing or biomass-derived feedstock into a liquid hydrocarbon material suitable for use as a fuel or as a blending component in a fuel.

BACKGROUND OF THE INVENTION

With increasing demand for liquid transportation fuels, decreasing reserves of 'easy oil' (crude petroleum oil that can be accessed and recovered easily) and increasing constraints on the carbon footprints of such fuels, it is becoming increasingly important to develop routes to produce liquid transportation fuels from alternative sources in an efficient manner.

Biomass offers a source of renewable carbon and refers to biological material derived from living or recently deceased organisms and includes lignocellulosic materials (e.g., wood), aquatic materials (e.g., algae, aquatic plants, and seaweed) and animal by-products and wastes (e.g., offal, fats, and sewage sludge). Liquid transportation fuels produced from biomass are sometimes referred to as biofuels. Therefore, when using such biofuels, it may be possible to achieve more sustainable $CO_2$ emissions over petroleum-derived fuels.

However, in the conventional pyrolysis of biomass, typically fast pyrolysis carried out in an inert atmosphere, a dense, acidic, reactive liquid bio-oil product is obtained, which contains water, oils and char formed during the process. The use of bio-oils produced via conventional pyrolysis is, therefore, subject to several drawbacks. These include increased chemical reactivity, water miscibility, high oxygen content and low heating value of the product. Often these products are difficult to upgrade to fungible liquid hydrocarbon fuels.

An efficient method for processing biomass into high quality liquid fuels is described in WO2010117437, in the name of Gas Technology Institute.

Solid feedstocks such as feedstocks containing waste plastics and feedstocks containing lignocellulose (e.g. woody biomass, agricultural residues, forestry residues, residues from the wood products and pulp & paper industries and municipal solid waste containing lignocellulosic material) are important feedstocks for biomass to fuel processes due to their availability on a large scale. Lignocellulose comprises a mixture of lignin, cellulose and hemicelluloses in any proportion and usually also contains ash and moisture.

The processes for the conversion of biomass into liquid hydrocarbon fuels described in WO2010117437 use hydropyrolysis and hydroconversion catalysts. While not being limited to any particular catalysts, exemplary catalysts for use in such processes include sulfided catalysts containing nickel, molybdenum, cobalt or mixtures thereof as active metal(s). Other catalysts for use in the hydropyrolysis and hydroconversion steps for the conversion of biomass to liquid hydrocarbon fuels are described in WO2015114008, WO02016001170, WO2016001134, WO2016001163 and co-pending application IN4737/CHE/2015.

A group of highly active and stable hydroprocessing catalysts is described in WO2010107908, WO2011056918, WO2012021386, WO2012021387 and WO2012021389 and elsewhere. The catalysts described in these documents comprise a shaped support into which at least one metal component is impregnated. After said impregnation step a further impregnation step is carried out in order to incorporate an organic additive. The catalyst precursor is then treated with hydrogen and is suitably then sulfided before being used for hydroprocessing.

Conventional hydroprocessing catalysts are generally not considered to be suitable for the hydro-deoxygenation processes required to convert biomass-derived feedstocks into high quality liquid fuels due to the amount of water produced in the conversion and the detrimental effect this has on the catalysts, particularly on long-term stability in the presence of water.

It would be advantageous to develop a range of catalysts, applicable to the conversion of biomass, biomass-containing and/or biomass-derived feedstocks to liquid hydrocarbon fuels, such as the process described in WO2010117437, that provide increased activity, allow the application of milder process conditions and/or result in improved product quality. Such catalysts must prove resilient to the temperatures and other conditions used in this process. It would also be advantageous to develop a wider range of catalysts, applicable for use in such processes and adaptable to a broader range of biomass, biomass-containing and/or biomass-derived feedstocks.

SUMMARY OF THE INVENTION

Accordingly, the present invention provides a process for producing liquid hydrocarbon products from a biomass, biomass-containing and/or biomass-derived feedstock, said process comprising the steps of:

a) contacting the feedstock with one or more hydropyrolysis catalyst compositions and molecular hydrogen in a hydropyrolysis reactor vessel at a temperature in the range of from 350 to 600° C. and a pressure in the range of from 0.50 to 7.50 MPa, to produce a product stream comprising hydropyrolysis product that is at least partially deoxygenated, $H_2O$, $H_2$, $CO_2$, CO, $C_1$-$C_3$ gases, char and catalyst fines;

b) removing all or a portion of said char and catalyst fines from said product stream;

c) hydroconverting said hydropyrolysis product in a hydroconversion reactor vessel in the presence of one or more hydroconversion catalyst compositions and of at least a portion of the $H_2O$, $CO_2$, CO, $H_2$, and $C_1$-$C_3$ gases generated in step a), to produce a vapour phase product comprising substantially fully deoxygenated hydrocarbon product, $H_2O$, CO, $CO_2$, and $C_1$-$C_3$ gases, wherein one or both of the hydropyrolysis catalyst composition and the hydroconversion catalyst composition is produced in a process comprising the steps of incorporating one or more metals selected from those of groups 6, 9, and 10 of the periodic table, into a shaped support; and incorporating one or more coordinating organic compounds into said shaped support, thus forming a catalyst precursor; and then either (i) treating the catalyst precursor in the presence of hydrogen and sulfiding it or (ii) calcining the catalyst precursor.

DETAILED DESCRIPTION OF THE INVENTION

Figure 1:
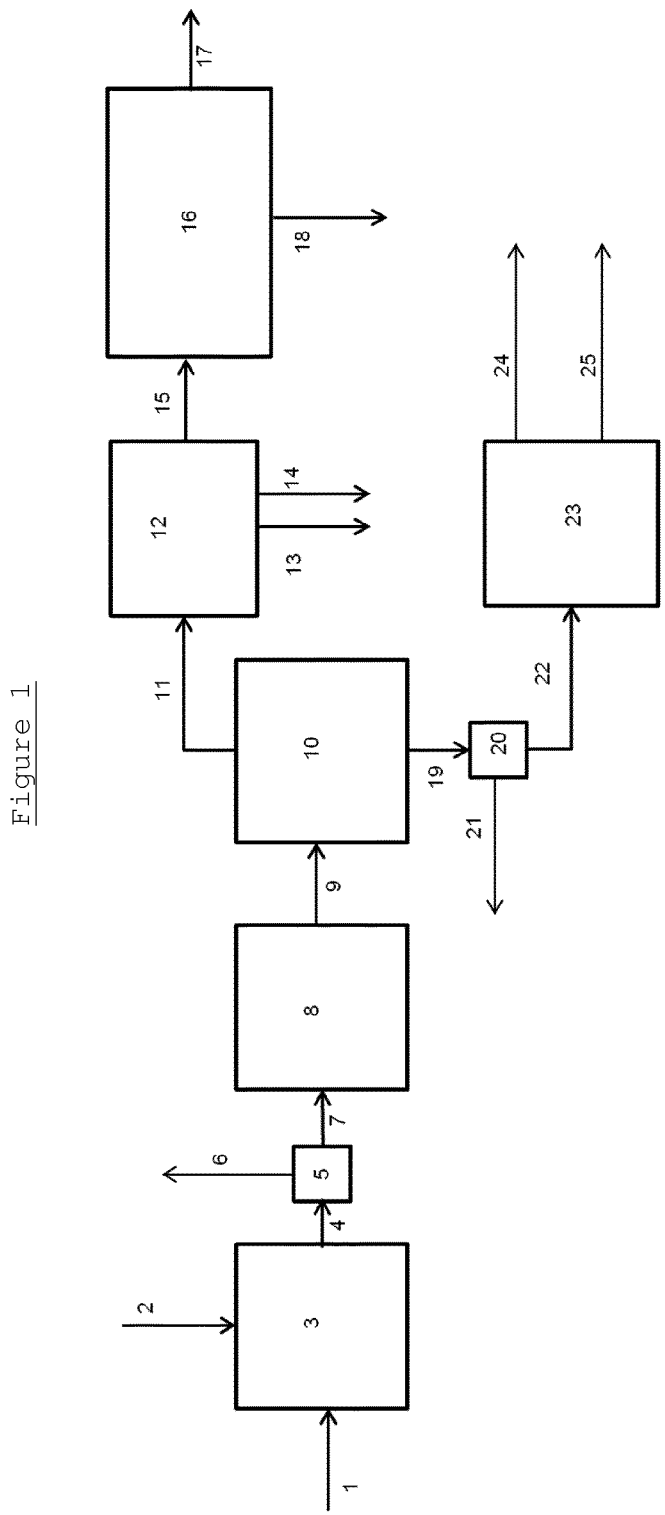
FIG. 1 shows a representation of one embodiment of the process of the invention.

The present inventors have found that an efficient and high yielding process for the conversion of biomass to liquid hydrocarbons can be achieved by using a process incorporating the steps of hydropyrolysis in the presence of a hydropyrolysis catalyst composition, char and catalyst fines removal and hydroconversion in the presence of a hydroconversion catalyst composition. In the inventive process, one or both of the hydropyrolysis catalyst composition and the hydroconversion catalyst composition comprises a catalytic composition produced in a process comprising the steps of incorporating one or more metals from groups 6, 9 and 10 into a shaped support; and incorporating one or more coordinating organic compounds into said shaped support, thus forming a catalyst precursor; and then either (i) treating the catalyst precursor in the presence of hydrogen and sulfiding it; or (ii) calcining the catalyst precursor. Suitable catalysts include, but are not limited to, those described in WO2010107908, WO2011056918, WO2012021386, WO2012021387 and WO2012021389.

For clarity, said catalytic composition, formed in a process comprising the steps of incorporating one or more metals from groups 6, 9 and 10 into a shaped support; and incorporating one or more coordinating organic compounds into said shaped support, thus forming a catalyst precursor; and then either (i) treating the catalyst precursor in the presence of hydrogen and sulfiding it; or (ii) calcining the catalyst precursor, is hereinafter referred to as the 'organics-treated catalytic composition'.

The feedstock used in the inventive process contains any combination of biomass, biomass-containing and/or biomass-derived feedstock.

The term 'biomass' refers to substances derived from organisms living above the earth's surface or within the earth's oceans, rivers, and/or lakes. Representative biomass can include any plant material, or mixture of plant materials, including woody biomass and agricultural and forestry products and residue, such as a hardwood (e.g., whitewood), a softwood, a hardwood or softwood bark, lignin, algae, and/or lemna (sea weeds). Energy crops, or otherwise agricultural residues (e.g., logging residues) or other types of plant wastes or plant-derived wastes, may also be used as plant materials. Specific exemplary plant materials include corn fiber, corn stover, castor bean stalks, sugar cane bagasse, round wood, forest slash, bamboo, sawdust, sugarcane tops and trash, cotton stalks, corn cobs, Jatropha whole harvest, Jatropha trimmings, de-oiled cakes of palm, castor and Jatropha, coconut shells, residues derived from edible nut production and mixtures thereof, and sorghum, in addition to 'on-purpose' energy crops such as switchgrass, miscanthus, and algae. Short rotation forestry products, such as energy crops, include alder, ash, southern beech, birch, eucalyptus, poplar, willow, paper mulberry, Australian Blackwood, sycamore, and varieties of paulownia elongate. Other examples of suitable biomass include organic oxygenated compounds, such as carbohydrates (e.g., sugars), alcohols, and ketones, as well as organic waste materials, such as waste paper, construction, demolition wastes, and biosludge.

Organic oxygenated compounds of particular interest include those contained in triglyceride-containing components, for example naturally occurring plant (e.g., vegetable) oils and animal fats, or mixtures of such oils and fats (e.g., waste restaurant oils or grease). Triglyceride-containing components, which are representative of particular types of biomass, typically comprise both free fatty acids and triglycerides, with the possible additional presence of monoglycerides and diglycerides. Triglyceride-containing components may also include those comprising derivative classes of compounds such as fatty acid alkyl esters (FAAE), which embrace fatty acid methyl esters (FAME) and fatty acid ethyl esters (FAEE).

Examples of plant oils include rapeseed (including canola) oil, corn oil, colza oil, crambe oil, sunflower oil, soybean oil, hempseed oil, olive oil, linseed oil, mustard oil, palm oil, peanut oil, castor oil, coconut oil, jatropha oil, camelina oil, cottonseed oil, salicornia oil, pennycress oil, algal oil, and other nut oils, and mixtures thereof. Examples of animal fats include lard, offal, tallow, train oil, milk fat, fish oil, sewage sludge, and/or recycled fats of the food industry, including various waste streams such as yellow and brown greases. Mixtures of one or more of these animal fats and one or more of these plant oils are also representative of particular types of biomass. The triglycerides and free fatty acids of a typical plant oil, animal fat, or mixture thereof, may include aliphatic hydrocarbon chains in their structures, with the majority of these chains having from about 8 to about 24 carbon atoms. Representative plant oils and/or animal fats, used as a triglyceride-containing component, may include significant proportions (e.g., at least about 30%, or at least about 50%) of aliphatic (e.g., paraffinic or olefinic) hydrocarbon chains with 16 and 18 carbon atoms. Triglyceride-containing components may be liquid or solid at room temperature. Representative triglyceride-containing components, including plant oils and animal fats, either in their crude form or pretreated, typically have a total oxygen content of about 10-12% by weight. Solid granulated algae that is optionally dried to a low moisture content, may be a suitable type of biomass, and in particular a triglyceride-containing component, in representative embodiments.

Low-quality and/or crude triglyceride-containing components, such as brown grease, are representative of biomass. Advantageously, such triglyceride-containing components may be introduced, according to specific embodiments, directly into the hydropyrolysis reactor without pretreatment, such that the reactor itself effectively performs the required transformations that allow the products of the hydropyrolysis of such low-quality and/or crude triglyceride-containing components, to be further processed in a hydroconversion reactor in an effective manner. Representative triglyceride-containing components, for example, include those that have a total chloride or metals content, and in some cases a total alkali metal and alkaline earth metal content, of greater than about 10 ppm (e.g. from about 10 ppm to about 500 ppm), or greater than about 25 ppm (e.g. from about 25 ppm to about 250 ppm). Such levels of contaminant chloride or metals, and particularly alkali and alkaline earth metals, are detrimental to catalyst activity in many types of conventional hydroprocessing operations.

A biomass-containing feedstock may comprise all or substantially all biomass, but may also contain non-biological materials (e.g., materials derived from petroleum, such as plastics, or materials derived from minerals extracted from the earth, such as metals and metal oxides, including glass). An example of a "biomass-containing" feedstock that may comprise one or more non-biological materials is municipal solid waste (MSW), that can include lignocellulosic material, waste plastics and/or food waste.

Such municipal solid waste may comprise any combination of lignocellulosic material (yard trimmings, pressure-treated wood such as fence posts, plywood), discarded paper and cardboard, food waste, textile waste, along with refractories such as glass, metal. Prior to use in the process of this invention, municipal solid waste may be optionally converted, after removal of at least a portion of any refractories, such as glass or metal, into pellet or briquette form. Co-processing of MSW with lignocellulosic waste is also envisaged. Certain food waste may be combined with sawdust or other material and, optionally, pelletised prior to use in the process of the invention.

Lignocellulosic material comprises a mixture of lignin, cellulose and hemicelluloses in any proportion and usually also contains ash and moisture.

Another specific example of a biomass-containing feedstock comprises biomass, as described herein, in addition to one or more oxygenated polymers (e.g., plastics) that contain oxygen in the functional groups of their repeating monomeric substituents. The oxygen is at least partly removed in deoxygenation reactions occurring in the hydropyrolysis and/or hydroconversion reactors of processes described herein, through the production of $H_2O$, $CO$, and/or $CO_2$. The remainder of the polymeric structure may be used to generate either aliphatic or aromatic hydrocarbons in the substantially fully deoxygenated hydrocarbon product or liquid hydrocarbon fuel. Representative oxygenated plastics have an oxygen content of at least 10% by weight (e.g., in the range from about 10 to about 45% by weight), with specific examples of oxygenated plastic co-feeds being polycarbonates (e.g., $(C_{15}H_{16}O_2)_n$, approx. 14% by weight O), poly (methyl methacrylate) (PMMA, $(C_5H_8O_2)_n$, approx. 32% by weight O), polyethylene terephthalate (PET, $(C_{10}H_8O_4)_n$, approx. 33% by weight O), and polyamines (e.g. $(CONH_2)_n$, approx. 36% by weight O). Due to the presence of hydrocarbon ring structures in certain oxygenated polymers (e.g. PET and polycarbonates), these oxygenated polymers may produce a relatively higher yield of aromatic hydrocarbons compared to aliphatic hydrocarbons in processes described herein, whereas other oxygenated polymers may produce a relatively higher yield of aliphatic hydrocarbons compared to aromatic hydrocarbons.

The term 'biomass-derived', for example when used in the phrase biomass-derived feedstock, refers to products resulting or obtained from the thermal and/or chemical transformation of biomass, as defined above, or biomass-containing feedstocks. Representative biomass-derived feedstocks therefore include, but are not limited to, products of pyrolysis (e.g. bio-oils), torrefaction (e.g. torrefied and optionally densified wood), hydrothermal carbonization (e.g. biomass that is pretreated and densified by acid hydrolysis in hot, compressed water), and polymerization (e.g. organic polymers derived from plant monomers). Other specific examples of biomass-derived products (e.g. for use as feedstocks) include black liquor, pure lignin, and lignin sulfonate.

Thermal and/or chemical transformation of biomass may occur in a pretreatment step prior to, or upstream of, the use of the resulting biomass-derived feedstock in processes described herein, including in a hydropyrolysis or hydroconversion step. Representative pretreating steps may use a pretreating reactor (pre-reactor), upstream of a hydropyrolysis reactor, and involve devolatilisation and/or at least some hydropyrolysis of a biomass-containing feedstock. Such devolatilisation and optional hydropyrolysis may be accompanied by other, beneficial transformations, for example to reduce corrosive species content, reduce hydropyrolysis catalyst poison content (e.g. reduce sodium), and/or a reduce hydroconversion catalyst poison content. Pretreatment in a pre-reactor may be carried out in the presence of a suitable solid bed material, for example a pretreating catalyst, a sorbent, a heat transfer medium, and mixtures thereof, to aid in effecting such supplemental transformations and thereby improve the quality of the biomass-derived feedstock. Suitable solid bed materials include those having dual or multiple functions. In the case of a pretreating catalyst, those having activity for hydroprocessing of the biomass, described herein, are representative. Certain pretreated feedstocks, for example resulting or obtained from devolatilisation and/or at least some hydropyrolysis, are also biomass-derived feedstocks, whereas other pretreated feedstocks, for example resulting or obtained from classification without thermal or chemical transformation, are biomass-containing feedstocks, but not biomass-derived feedstocks.

Biomass-derived feedstocks also include products of a Biomass to Liquid (BTL) pathway, which may be products of Fischer-Tropsch (F-T) synthesis, and more specifically the products of gasification, followed by F-T synthesis. These products are generally of significantly lower quality, compared to their counterpart, paraffin-rich petroleum derived products used for fuel blending. This quality deficit results from the presence of biomass-derived aliphatic alcohols and other biomass-derived organic oxygenated byproduct compounds, as well as possibly reactive olefins, with amounts of these non-paraffinic impurities depending on the F-T catalyst system and processing conditions used. Representative total oxygen contents of F-T synthesis products, as biomass-derived feedstocks, are typically in the range from about 0.25% to about 10%, and often from about 0.5% to about 5% by weight. In addition, products of F-T synthesis, including F-T waxes, have a wide carbon number (and consequently molecular weight) distribution and very poor cold flow properties. Both of these characteristics may be improved using appropriate transformations in processes described herein, for example in the hydroconversion step, to convert F-T waxes into a paraffin-rich component, with a lower average molecular weight (and narrower molecular weight distribution) and/or with a greater degree of branching (or content of isoparaffins), in order to meet specifications for distillate fuel fractions of the substantially fully deoxygenated hydrocarbon product or liquid hydrocarbon, such as a diesel boiling range fraction and/or an aviation (e.g., jet) fuel boiling range fraction.

Gasification (e.g., non-catalytic partial oxidation) of a wide variety of carbonaceous feedstocks, including biomass as defined above, may provide the syngas used for F-T synthesis. F-T synthesis refers to a process for converting syngas, namely a mixture of CO and $H_2$, into hydrocarbons of advancing molecular weight according to the reaction:

$n(CO+2H_2) \rightarrow (-CH_2-)_n + nH_2O + heat.$

The F-T synthesis reaction generates reaction products having a wide range of molecular weights, from that of methane to those of heavy paraffin waxes. The particular mixture of generally non-cyclic paraffinic and olefinic hydrocarbons, as well as the proportions of these reaction products, are governed substantially by the catalyst system used. Normally, the production of methane is minimized and a substantial portion of the hydrocarbons produced have a carbon chain length of a least 5 carbon atoms. Therefore, $C_5^+$ hydrocarbons are present in the F-T synthesis product in an amount generally of at least about 60% (e.g., from about 60% to about 99%), and typically at least about 70% (e.g. from about 70% to about 95%) by weight. The F-T synthesis product may be pretreated for the removal of light hydrocarbons (e.g., $C_1$-$C_4$ hydrocarbons) and water. However, since these components are well-tolerated in processes described herein, and are even beneficial in some cases (e.g., for the production of required hydrogen via reforming), raw products of F-T synthesis (i.e., without pretreatment) may also be suitable as biomass-derived feedstocks. Such raw products may have a combined, $C_1$-$C_4$ hydrocarbon and oxygenated hydrocarbon content of greater than about 1% by volume, and even greater than 5% by volume.

As in the case of certain F-T synthesis products, other types of crude or low-quality biomass or biomass-derived feedstocks, for example particular triglyceride-containing components such as brown grease, may be pretreated. Brown grease includes solid particulates such as rotten food particles. Crude triglyceride-containing components may otherwise include phospholipids (gums) and metal contaminants, including alkali and alkaline earth metals. Due to a high solids content, high hydroconversion catalyst poison content, and/or propensity to cause hydroconversion catalyst plugging, low-quality and/or crude triglyceride-containing components may be suitably upgraded by pretreatment to reduce the content of solids or other of these undesirable materials. A pretreated triglyceride-containing component represents a particular type of biomass-derived feedstock.

Biomass-derived feedstocks also extend to pretreated feedstocks that result or are obtained from thermal and/or chemical transformation, prior to, or upstream of, their use as feedstocks for processes described herein. Particular biomass-derived feedstocks are conventional pyrolysis oils, i.e. products of conventional pyrolysis processes, including fast pyrolysis processes as described in U.S. Pat. No. 5,961,786, CA1283880 and by Bridgwater, A. V., 'Biomass Fast Pyrolysis' Review paper BIBLID: 0354-9836, 8 (2004), 2, 21-49). Representative biomass-derived feedstocks in which the original lignocellulosic components have been transformed may comprise a significant quantity, for example generally from about 5% to about 85%, and often from about 10% to about 75%, by weight of cyclic compounds, including cyclic organic oxygenates. The term "cyclic organic oxygenates" is meant to include compounds in which oxygen is incorporated into a ring structure (e.g., a pyran ring), as well as compounds (e.g., phenol) having a ring structure with oxygen being incorporated outside the ring structure. In either case, the ring structure may have from 3 to 8 ring members, be fused to other ring structures, and may be completely saturated (e.g., naphthenic), completely unsaturated (e.g., aromatic), or partially unsaturated. After being subjected to hydroconversion in processes described herein, these cyclic compounds, including cyclic organic oxygenates, may contribute to the total aromatic hydrocarbon content of the substantially fully deoxygenated hydrocarbon product or liquid hydrocarbon fuel. These cyclic compounds are preferably obtained from natural sources, such as lignocellulosic biomass, as described above, that has been pyrolyzed to depolymerize and fragment the cyclic building blocks of cellulose, hemicellulose, and lignin.

A representative biomass-derived feedstock is, therefore, conventional pyrolysis oil (bio-oil), containing significant quantities of cyclic compounds (e.g., generally from about 10% to about 90% by weight, and typically from about 20% to about 80% by weight), as described above, that are precursors, in processes described herein, to aromatic hydrocarbons. Pyrolysis oil contains often from about 30% to about 40%, by weight of total oxygen, for example in the form of both (i) organic oxygenates, such as hydroxyaldehydes, hydroxyketones, sugars, carboxylic acids and phenolic oligomers, and (ii) dissolved water. For this reason, although a pourable and transportable liquid fuel, pyrolysis oil (and particularly raw pyrolysis oil that has not been pretreated) has only about 55-60% of the energy content of crude oil-based fuel oils. Representative values of the energy content are in the range from about 19.0 MJ/liter (69,800 BTU/gal) to about 25.0 MJ/liter (91,800 BTU/gal). Moreover, this raw product is often corrosive and exhibits chemical instability due to the presence of highly unsaturated compounds such as olefins (including diolefins) and alkenylaromatics. In processes as described herein, pyrolysis oil may be further deoxygenated and undergo other transformations to yield hydrocarbons in the substantially fully deoxygenated hydrocarbon liquid or liquid hydrocarbon fuel recovered from the hydroconversion step. According to some embodiments, aromatic hydrocarbons derived from conventional pyrolysis oil may be concentrated in a liquid product following fractionation of the substantially fully deoxygenated hydrocarbon liquid, whereby the product is suitable for blending in fuels, such as gasoline, or otherwise is useful as such a fuel without blending (e.g., a gasoline boiling range fraction meeting one or more, and possibly all, applicable gasoline specifications).

Further specific examples of biomass-derived feedstocks include byproducts of Kraft or sulfate processing for the conversion of wood into pulp. These byproducts include black liquor, tall oil, pure lignin, and lignin sulfonate. Tall oil refers to a resinous yellow-black oily liquid, which is namely an acidified byproduct of pine wood processing. Tall oil, prior to refining, is normally a mixture of rosin acids, fatty acids, sterols, high-molecular weight alcohols, and other alkyl chain materials. Distillation of crude tall oil may be used to recover a tall oil fraction (depitched tall oil) that is enriched in the rosin acids, for use as a biomass-derived feedstock that produces a relatively higher yield of aromatic hydrocarbons compared to aliphatic hydrocarbons.

Naturally derived (e.g., non-fossil derived) oils rich in cyclic compounds, and therefore useful as biomass-derived feedstocks, including pyrolysis oil, and Kraft or sulfate processing byproducts (e.g., black liquor, crude tall oil, and depitched tall oil) as described herein, have a high oxygenate content that is detrimental to their value for use as biofuels, without deoxygenation. In the case of tall oil, for example, rosin acids (all multi-ring organic acids) are present in significant concentrations. Deoxygenation of these oxygenated cyclic compounds under hydropyrolysis and/or hydroconversion conditions beneficially yields aromatic hydrocarbons. In combination with oxygen removal, ring saturation and/or ring opening of at least one ring (but not all rings) of the multi-ring compounds leads to the formation of naphthenic and/or alkylated cyclic hydrocarbons, respectively. Importantly, the naphthenic/aromatic hydrocarbon equilibrium under the particular hydropyrolysis and/or hydroconversion conditions used, may be used to govern the relative proportions of these species and thereby meet desired specifications for a particular application, for example the yield, or content, of aromatic hydrocarbons in a gasoline boiling range fraction or aviation fuel boiling range fraction of the substantially fully deoxygenated hydrocarbon product or liquid hydrocarbon, as needed to meet desired specifications (e.g. octane number in the case of gasoline specifications or aromatic hydrocarbon content in the case of aviation (non-turbine or jet) fuel specifications).

Yet further examples of biomass-derived feedstocks include oils obtained from aromatic foliage such as eucalyptols, as well as solid granulated lignin that is optionally dried to a low moisture content. These examples can also ultimately lead to the formation of aromatic hydrocarbons in the substantially fully deoxygenated hydrocarbon product or liquid hydrocarbon fuel.

Representative biomass-derived feedstocks may be pretreated to improve quality, prior to introduction into processes as described herein. Tall oil, for example, may be used either in its crude form or may otherwise be pretreated by distillation (e.g., vacuum distillation) to remove pitch (i.e., providing depitched tall oil) and/or concentrate the rosin acids, which are primarily abietic acid and dehydroabietic acid but include other cyclic carboxylic acids. A biomass-derived feedstock may in general be obtained by a pretreatment involving separation to remove unwanted materials, for example from a crude tall oil or a crude pyrolysis oil (bio-oil). In the case of crude bio-oil, for example, pretreatment by filtration and/or ion exchange may be used to remove solids and/or soluble metals, prior to introduction of the pretreated bio-oil to a process as described herein. According to other embodiments, biomass-derived feedstocks in a crude or low-quality form, such as crude bio-oil or black liquor, may also be advantageously introduced directly into processes as described herein without such pretreatment steps, such that one or more process steps (e.g., hydropyrolysis and/or hydroconversion) may itself perform the necessary pretreatment and/or desired further transformations to ultimately yield liquid hydrocarbons. In the case of a hydropyrolysis reactor performing a pretreatment step, the partially deoxygenated hydropyrolysis product, including products of the hydropyrolysis of a crude or low-quality biomass-derived feedstock, can be further processed in a hydroconversion step in an effective manner.

Any of the types of biomass-containing and biomass-derived feedstocks described herein may be combined and introduced to processes as described herein, or otherwise introduced separately, for example at differing axial positions into the hydropyrolysis and/or hydroconversion reactor. Different types of biomass-containing and/or biomass-derived feedstocks may be introduced into either the hydropyrolysis reactor or the hydroconversion reactor, although, according to particular embodiments described above, the introduction into one of these reactors (e.g., in the case of a crude or low-quality biomass-derived feedstock being introduced into the hydropyrolysis reactor vessel) may be preferable.

In one embodiment of the invention, after steps a) and b), the hydropyrolysis product may be stored or transported to a remote location before step c) is carried out. One advantage of the present invention is that the hydropyrolysis product is stable and can be shipped or stored without suffering from considerable degradation or corrosion problems. In an alternative embodiment of the invention, steps a), b) and c) are carried out at the same geographical location.

In one embodiment of the invention, the hydropyrolysis catalyst composition comprises a catalytic composition formed in a process comprising the steps of incorporating one or more metals from groups 6, 9 and 10 into a shaped support; incorporating one or more coordinating organic compounds into the shaped support, thus forming a catalyst precursor; and then either (i) treating the catalyst precursor in the presence of hydrogen and sulfiding it; or (ii) calcining the catalyst precursor.

In this embodiment of the invention, the hydroconversion catalyst composition may also comprise a catalytic composition formed in a process comprising the steps of incorporating one or more metals from groups 6, 9 and 10 into a shaped support; and incorporating one or more coordinating organic compounds into said shaped support, thus forming a catalyst precursor; and then either (i) treating the catalyst precursor in the presence of hydrogen and sulfiding it; or (ii) calcining the catalyst precursor. Alternatively, the hydroconversion catalyst composition may be any other suitable known hydroconversion catalyst composition known in the art, including, but not limited to, those described in WO2015114008, WO2016001170, WO2016001134, WO2016001163 and co-pending application IN4737/CHE/2015.

In either of such embodiments in which the hydropyrolysis catalyst composition is formed as described above, it may be formed by (i) treating the catalyst precursor in the presence of hydrogen and sulfiding it, such that the one or more metals from groups 6, 9 and 10 are in their sulfided form.

In another embodiment of the invention, only the hydroconversion catalyst composition comprises a catalytic composition formed in a process comprising the steps of incorporating one or more metals from groups 6, 9 and 10 into a shaped support; and incorporating one or more coordinating organic compounds into said shaped support, thus forming a catalyst precursor; and then either (i) treating the catalyst precursor in the presence of hydrogen and sulfiding it; or (ii) calcining the catalyst precursor.

In this embodiment of the invention, the hydropyrolysis catalyst composition may be any other suitable known hydropyrolysis catalyst composition known in the art, including, but not limited to, those described in WO2015114008, WO2016001170, WO2016001134, WO2016001163 and co-pending application IN4737/CHE/2015.

In embodiments in which the hydroconversion catalyst composition is formed as described above, the hydroconversion catalyst composition may be formed by (ii) calcining the catalyst precursor, such that the one or more metals from groups 6, 9 and 10 are in their oxidic form as described herein.

In embodiments described herein, wherein one or both of the hydropyrolysis catalyst composition and the hydroconversion catalyst composition is produced in a process comprising the steps of incorporating one or more metals from groups 6, 9 and 10 into a shaped support; and incorporating one or more coordinating organic compounds into said shaped support, thus forming a catalyst precursor; and then either (i) treating the catalyst precursor in the presence of hydrogen and sulfiding it or (ii) calcining the catalyst precursor, a number of processing advantages may be realized. Such advantages may include a lower density of the substantially fully deoxygenated hydrocarbon product (e.g., hydrocarbon liquid recovered from a $2^{nd}$ stage of hydroconversion, following a $1^{st}$ stage of hydropyrolysis), an increased percentage by weight of a gasoline boiling-range fraction of the substantially fully deoxygenated hydrocarbon product, and/or an increased yield (e.g., as a percentage by weight of the feedstock on a moisture- and ash-free basis) of gasoline boiling-range hydrocarbons. Any such advantages obtained may be relative to a reference process conducted under the same processing conditions but using, as both a hydropyrolysis catalyst composition and a hydroconversion catalyst composition, suitable hydropyrolysis and hydroconversion catalyst compositions known in the art, including, but not limited to, those described in WO2015114008, WO2016001170, WO2016001134, WO2016001163 and co-pending application IN4737/CHE/2015.

The shaped support for the organics-treated catalytic composition is prepared by mixing an inorganic oxide powder of porous refractory oxide with any other components present. Other components may be added to the mixture to provide the desired mixture properties and characteristics to permit the agglomeration or shaping of the mixture by any of the known means or methods, such as, by extrusion, granulation, beading, tablet pressing, pill making, bracketing, and the like, to provide a shaped support. For example, water, and, if desired or necessary, other chemical aids such as peptizing agents or flocculating agents or binders or other compounds are combined or mixed with the inorganic oxide powder, to form a mixture or paste that may be formed into an agglomerate or shaped particle. The formed shaped support may be a shape such as a cylinder, a bead, a sphere, a ring, and symmetrical and asymmetrical polylobes, such as trilobes or quadrulobes. Cylinders can be preferred.

Optionally, the one or more metals from groups 6, 9 and 10 and/or the one or more coordinating organic compounds may be incorporated into the shaped support at this stage, for example by co-mulling. Alternatively, the one or more metals from groups 6, 9 and 10 and/or the one or more coordinating organic compounds may be incorporated into the shaped support by impregnation.

The thus-formed agglomerate or shaped particle is then dried and calcined to give the final shaped support used in the preparation of the organics-treated catalyst composition.

The porous refractory oxide of the inorganic oxide powder used in the preparation of the shaped support may be any material that can suitably provide for the support of the metal components of the organics treated catalytic composition and which has porosity that may further be filled with the one or more coordinating organic compound. Examples of possible suitable porous refractory oxides include silica, alumina, titania, zirconia, silica-alumina, silica-titania, silica-zirconia, titania-alumina, zirconia-alumina, silica-titania and combinations of two or more thereof. The preferred porous refractory oxide for use in the preparation of the shaped support of the inventive composition is one selected from the group consisting of alumina, silica, and silica-alumina. Among these, the most preferred porous refractory oxide is alumina.

The agglomerate or shaped particle from which the shaped support is made is dried under standard drying conditions that can include a drying temperature in the range of from 50° C. to 200° C., preferably, from 75° C. to 175° C., and more preferably, from 90° C. to 150° C. The thus-dried material is then calcined under standard calcination conditions that include a calcination temperature in the range of from 250° C. to 900° C., preferably, from 300° C. to 800° C., and, most preferably, from 350° C. to 600° C.

The shaped support that has been calcined preferably has a surface area and pore volume that allow for the impregnation of the shaped support with the metal components and the one or more coordinating organic compound.

If the one or more metals from groups 6, 9 and 10 are incorporated into the shaped support by impregnation, preferably, the shaped support is impregnated in one or more impregnation steps with at least one metal component using one or more aqueous solutions containing at least one metal salt wherein the metal compound of the metal salt solution is an active metal or active metal precursor. The metal elements are those selected from Group 6, Group 9 and Group 10 of the IUPAC Periodic Table of the Elements. Preferably, one or more metal from Group 6 and one or more metal from either Group 9 or Group 10 are used. Preferably, the metal from Group 6 is molybdenum. Also preferably, the metal from either Group 9 or Group 10 is selected from nickel, cobalt and mixtures thereof.

Particularly preferred metals are a combination of nickel and molybdenum or a combination of cobalt and molybdenum.

For the Group 9 and 10 metals, suitable metal salts include Group 9 or 10 metal acetates, formates, citrates, oxides, hydroxides, carbonates, nitrates, sulfates, and two or more thereof. The preferred metal salts are metal nitrates, for example, such as nitrates of nickel or cobalt, or both. For the Group 6 metals, preferred are salts containing the Group 6 metal and an ammonium ion, such as ammonium heptamolybdate and ammonium dimolybdate.

In this embodiment, the concentration of the metal compounds in the impregnation solution (metal-containing solution) is selected so as to provide the desired metal content in the organics-treated catalytic composition used in the process of the invention taking into consideration the pore volume of the shaped support into which the aqueous solution is to be impregnated. Typically, the concentration of metal compound in the impregnation solution is in the range of from 0.01 to 100 moles per liter.

The metal content of the Group 9 and/or 10 metal component, i.e., cobalt or nickel, in the metal-impregnated support is typically in an amount in the range of from 0.5 wt % to 20 wt %, preferably from 1 wt % to 15 wt %, and, most preferably, from 2 wt % to 12 wt %.

The metal content of the Group 6 metal component, i.e., molybdenum or tungsten, preferably, molybdenum, in the metal-impregnated support is typically in an amount in the range of from 5 wt % to 50 wt %, preferably from 8 wt % to 40 wt %, and, most preferably, from 12 wt % to 30 wt %.

The above-referenced weight percentages for the metal components are based on the weight of the dry shaped support and the metal component as being the element regardless of the actual form, e.g., the oxide form or sulfide form, of the metal component.

In the method of preparing or making the organics-treated catalytic composition for use in the process of the invention, the metal-containing impregnation solution may be an aqueous solution comprising at least one metal, as described above, having a hydrogenation function. The at least one metal of the metal-containing impregnation solution may include, for example, a metal selected from the group consisting of nickel, cobalt, molybdenum, tungsten and any combination of two or more thereof, and is incorporated into the shaped support to thereby provide a metal-incorporated shaped support.

The incorporation of the metal-containing impregnation solution into the shaped support may be done by any suitable means or method known to those skilled in the art. Such method may include standard impregnation by incipient wetness or even soaking the shaped support with an excess amount of the metal-containing impregnation solution than would be used in a dry impregnation or an incipient wetness impregnation.

Regardless, however, of the actual means or method used to incorporate the metal-containing impregnation solution into the shaped support, the pores of the resulting metal-incorporated shaped support may be filled with the impregnation solution and, as a result, are unable to retain or be filled with any additional volume of liquid or other material. The metal-incorporated shaped support, thus, may undergo a drying step by which at least a portion of the volatiles content is driven from the metal-incorporated shaped support but leaving the metals behind upon the surface of the support material. The removal of at least a portion of the volatiles from the metal-incorporated shaped support opens up pore volume which may in a later preparation step be filled with the one or more coordinating organic compounds. The metal-incorporated shaped support, thus, may be dried under drying conditions that include a drying temperature that is less than a calcination temperature.

The drying temperature under which the step of drying the metal-incorporated shaped support is conducted should not to exceed a calcination temperature. Thus, the drying temperature should not exceed 400° C., and, preferably, the drying temperature at which the metal-incorporated shaped support is dried does not exceed 300° C., and, most preferably, the drying temperature does not exceed 250° C. It is understood that this drying step will, in general, be conducted at lower temperatures than the aforementioned temperatures, and, typically, the drying temperature will be conducted at a temperature in the range of from 60° C. to 150° C.

The drying of the metal-incorporated shaped support is preferably controlled in a manner so as to provide the resulting dried metal-incorporated shaped support that has a volatiles content in a particular range. The volatiles content of the dried metal-incorporated shaped support should be controlled so that it does not exceed 20 wt % LOI. It is preferred for the LOI of the dried metal-incorporated shaped support to be in the range of from 1 wt % to 20 wt % LOI, and, most preferred, from 3 wt % to 15 wt % LOI.

LOI, or loss on ignition, is defined as the percentage weight loss of the material after its exposure to air at a temperature of 482° C. for a period of two hours. LOI can be represented by the following formula: (sample weight before exposure less sample weight after exposure) multiplied by 100 and divided by (sample weight before exposure).

In the embodiment wherein the one or more coordinating organic compounds is incorporated into the shaped support by impregnation, the shaped support may be impregnated with the one or more coordinating organic compounds at the same time as the shaped support is impregnated with the one or more metals, by using an impregnation solution comprising the one or more metals and the one or more coordinating organic compounds.

Alternatively, the shaped support may be impregnated with the one or more coordinating organic compounds after the shaped support is impregnated with the one or more metals by contacting or wetting the, optionally dried, metal-incorporated shaped support with a liquid comprising the one or more coordinating organic compounds.

Also alternatively, the shaped support may be impregnated with the one or more coordinating organic compounds at the same time as the shaped support is impregnated with the one or more metals, by using an impregnation solution comprising the one or more metals and the one or more coordinating organic compounds and then further impregnated with the same or different one or more coordinating organic compounds by contacting or wetting the, optionally dried, metal-incorporated shaped support with a liquid comprising the one or more coordinating organic compounds.

Any suitable means or method can be used to contact the shaped support with the one or more coordinating organic compounds, provided such means or method provides for the suitable incorporation or impregnation of the one or more coordinating organic compounds within the pores of the support material. Examples of suitable methods of applying the one or more coordinating organic compounds to the shaped support can include dipping or spraying.

The preferred method of impregnation of the, optionally metal-incorporated, shaped support with the one or more coordinating organic compounds may be any standard well-known pore fill methodology whereby the pore volume is filled by taking advantage of capillary action to draw the liquid into the pores of the, optionally metal-incorporated, shaped support. It is desirable to fill at least 75% of the available pore volume of the optionally metal-incorporated shaped support with the one or more coordinating organic compounds, and, preferably, at least 80% of the available pore volume of the optionally metal-incorporated shaped support is filled with the one or more coordinating organic compounds. Most preferably, at least 90% of the available pore volume of the optionally metal-incorporated shaped support is filled with the one or more coordinating organic compounds.

The coordinating organic compounds may be any organic compounds that coordinate with the metals impregnated on the shaped support. Suitable coordinating organic compounds include heterocompounds. However, other coordinating organic compounds, such as alpha olefins are also suitable. A heterocompound is considered herein to be a molecule that includes atoms in addition to carbon and hydrogen. These additional atoms can include, for example, nitrogen or oxygen, or both. It is desirable for the group of heterocompounds to exclude those heterocompounds that include sulfur.

A preferred characteristic of the one or more coordinating organic compounds is for its boiling temperature to be in the range of from 50° C. to 270° C. More preferably, the boiling temperature of the one or more coordinating organic compounds is to be in the range of from 60° C. to 250° C., and, most preferably, it is in the range of from 80° C. to 225° C.

The most desirable compounds for use as the one or more coordinating organic compounds are those selected from the group of amide compounds, such as dialkyl amides, for example dimethylformamide (DMF); organic carbonates, including cyclic alkylene carbonates such as propylene carbonate; organic acids, including those having one or multiple carboxylic acid functional groups, such as malic acid and tartaric acid; long chain amines, including alkylamines such as dodecylamine; and unsaturated hydrocarbons including olefins and particularly alpha-olefins. Combinations of any of these coordinating organic compounds may also be used.

In one embodiment of the invention, the catalyst precursor, comprising the shaped support into which has been incorporated the one or more metals and the one or more coordinating organic compounds, is treated, either ex situ or in situ, with hydrogen.

Such hydrogen treatment includes exposing the catalyst precursor to a gaseous atmosphere containing hydrogen at a temperature ranging upwardly to 250° C. Preferably, the catalyst precursor is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 0.1 MPa to 7 MPa, preferably, from 0.15 MPa to 5.5 MPa, and, most preferably, from 0.2

MPa to 3.5 MPa. The catalyst precursor is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

In this embodiment of the invention, after or during said hydrogen treatment step, the catalyst precursor is also subjected to sulfiding. Preferably, in this embodiment, the sulfidation step is carried out after the catalyst precursor has been subjected to hydrogen treatment for a period of time and the hydrogen treatment step continues during sulfidation.

Sulfiding of the catalyst precursor can be done using any conventional method known to those skilled in the art. Thus, the catalyst precursor can be contacted, after or during the hydrogen treatment step, with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS). Also, preferably, the sulfiding is accomplished by contacting the catalyst precursor, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfidation treatment conditions are those which provide for the conversion of the active metal components of the catalyst precursor to their sulfided form. Typically, the sulfiding temperature at which the catalyst precursor is contacted with the sulfur compound is in the range of from 150° C. to 450° C., preferably, from 175° C. to 425° C., and, most preferably, from 200° C. to 400° C.

In an alternative catalyst precursor treatment embodiment, the catalyst precursor is calcined in the presence of air or oxygen. Said calcination is preferably carried out at a temperature in the range of from 450 to 520° C. Preferably, a drying step is carried out before the calcination step. Said drying step is suitably carried out at a temperature in the range of from 100 to 150° C.

The catalyst composition prepared in the embodiment in which the catalyst precursor is calcined will be provided to the reactor in its oxidic state. By the term 'oxidic state' as used herein is meant that 95% or more of the active metal atoms in the catalyst are present in an oxidation state greater than zero as oxides. For example, a supported oxidic CoMo catalyst has more than 95% of the metal present either as molybdenum present in the +6 oxidation state as oxides or cobalt present in the +2 or +3 oxidation state as oxides.

Catalyst composition particles sizes, for use in a commercial reactor in the hydropyrolysis step, are preferably in the range of from 0.3 mm to 4.0 mm, more preferably in the range of from 0.6 mm to 3.0 mm, and most preferably in the range of from 1 mm to 2.4 mm.

Catalyst composition particles sizes, for use in a commercial reactor in the hydroconversion step, are preferably in the range of from 0.3 mm to 4.0 mm, more preferably in the range of from 0.6 mm to 3.0 mm. Preferably, the hydroconversion catalyst composition is used in an extruded form, for example cylindrical or as trilobes.

In the inventive process, biomass, biomass-containing and/or biomass-derived feedstock and molecular hydrogen are introduced into the hydropyrolysis reactor vessel containing the hydropyrolysis catalyst composition, in which vessel the biomass undergoes hydropyrolysis, producing an output comprising hydropyrolysis product that is at least partially deoxygenated, char, light gases ($C_1$-$C_3$ gases, $H_2O$, $CO$, $CO_2$, and $H_2$) and catalyst fines. Although any type of reactor suitable for hydropyrolysis may be employed, the preferred type of reactor is a bubbling fluidized bed reactor. The fluidization velocity, catalyst size and bulk density and biomass size and bulk density are chosen such that the catalyst remains in the bubbling fluidized bed, while the char produced gets entrained out of the reactor. The hydropyrolysis step employs a rapid heat up of the biomass feed such that the residence time of the pyrolysis vapours in the reactor vessel is preferably less than about 1 minute, more preferably less than 30 seconds and most preferably less than 10 seconds.

The biomass, biomass-containing and biomass-derived feedstocks, as described herein, encompass feedstocks that are either liquid or solid at room temperature, or otherwise a solid-liquid slurry (e.g., crude animal fats containing solids).

The biomass, biomass-containing and/or biomass-derived feedstock utilized in the process of this invention may be in the form of loose biomass particles having a majority of particles preferably less than about 3.5 mm in size or in the form of a biomass/liquid slurry, in which the liquid component of the slurry may itself be, biomass, a biomass-containing feedstock or biomass-derived feedstock as described herein. However, it will be appreciated by those skilled in the art that the biomass feed may be pre-treated or otherwise processed in a manner such that larger particle sizes may be accommodated. Suitable means for introducing the biomass feed into the hydropyrolysis reactor vessel include, but are not limited to, an auger, fast-moving (greater than about 5 m/sec) stream of support gas (such as inert gases and $H_2$), and constant-displacement pumps, impellers, or turbine pumps. In the most preferred embodiment of the invention, a double-screw system comprising of a slow screw for metering the biomass followed by a fast screw to push the feedstock into the reactor without causing torrefaction in the screw housing is used for biomass dosing. An inert gas or hydrogen flow is maintained over the fast screw to further reduce the residence time of the biomass in the fast screw housing.

The hydropyrolysis is carried out in the hydropyrolysis reactor vessel at a temperature in the range of from 350° C. to 600° C. and a pressure in the range of from 0.50 MPa to 7.50 MPa. The heating rate of the biomass is preferably greater than about 100 W/m². The weight hourly space velocity (WHSV) in g(biomass)/g(catalyst)/hr for this step is suitably in the range of from 0.2 $h^{-1}$ to 10 $h^{-1}$, preferably in the range of from 0.3 $h^{-1}$ to 3 $h^{-1}$.

The hydropyrolysis step may operate at a temperature hotter than is typical of a conventional hydroprocessing processes familiar to those skilled in the state-of-the-art of hydrotreating and hydrocracking of petroleum-derived fractions, as a result of which the biomass is rapidly devolatilized. Thus, in a preferred embodiment, the step includes use of an active catalyst composition to stabilize the hydropyrolysis vapours, but not so active that it rapidly cokes.

The hydropyrolysis step of the inventive process produces a hydropyrolysis product that is at least partially deoxygenated. The term 'partially deoxygenated' is used herein to describe material in which at least 30 wt %, preferably at least 50 wt %, more preferably at least 70 wt % of the oxygen present in the original biomass, biomass-containing and/or biomass-derived feedstock has been removed. The extent of oxygen removal here refers to the percentage of the oxygen in the feedstock (e.g., chemically bound in the lignocellulose), excluding that contained in the free moisture in the feedstock. This oxygen is removed in the form of $H_2O$, CO and $CO_2$ in the hydropyrolysis step. Although it is possible that 100 wt % of the oxygen present in the original feedstock is removed, typically at most 98 wt %, suitably at most 95 wt % will be removed in the hydropyrolysis step.

In between the hydropyrolysis and hydroconversion steps, char and catalyst fines are typically removed from the hydropyrolysis product. Any ash present will normally also be removed at this stage. The most preferred method of char and catalyst fines removal from the vapour stream is by cyclone separation. Solids separation equipment (e.g. cyclones) may also be used inside the hydroprocessing reactor (above a dense bed phase) to prevent the entrainment of solid particles above a certain particle size.

Char may also be removed in accordance with the process of this invention by filtration from the vapour stream, or by way of filtering from a wash step—ebullated bed. Back-pulsing may be employed in removing char from filters, as long as the hydrogen used in the process of this invention sufficiently reduces the reactivity of the pyrolysis vapours and renders the char produced free-flowing. Electrostatic precipitation, inertial separation, magnetic separation, or a combination of these technologies may also be used to remove char and catalyst fines from the hot vapour stream before further hydrofinishing, cooling and condensation of the liquid product.

In accordance with one embodiment of this invention, cyclone separation followed by hot gas filtration to remove fines not removed in the cyclones may be used to remove the char. In this case, because the hydrogen has stabilized the free radicals and saturated the olefins, the dust cake caught on the filters is more easily cleaned than char removed in the hot filtration of the aerosols produced in conventional fast pyrolysis. In accordance with another embodiment of this invention, the char and catalyst fines are removed by bubbling first stage product gas through a re-circulating liquid. The re-circulated liquid used is the high boiling point portion of the finished oil from this process and is thus a fully saturated (hydrogenated), stabilized oil having a boiling point typically above 370° C. Char or catalyst fines from the first reaction stage are captured in this liquid. A portion of the liquid may be filtered to remove the fines and a portion may be re-circulated back to the first stage hydropyrolysis reactor. One advantage of using a re-circulating liquid is that it provides a way to lower the temperature of the char-laden process vapours from the first reaction stage to the temperature desired for the second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, cyclone separation followed by trapping the char and catalyst fines in a high-porosity solid adsorbent bed is used to remove the char and catalyst fines from the vapour stream. Examples of high-porosity solid adsorbents suitable for trapping char and catalyst fines include CatTrap® materials available from Crystaphase.

Inert graded bed materials may also be used to remove the char and catalyst fines from the vapour stream.

In accordance with another embodiment of this invention, large-size NiMo or CoMo catalysts, deployed in an ebullated bed, are used for char removal to provide further deoxygenation simultaneous with the removal of fine particulates. Particles of this catalyst should be large, preferably in the range of from 15 to 30 mm in size, thereby rendering them easily separable from the fine char carried over from the first reaction stage, which is typically less than 200 mesh (smaller than 70 micrometers).

Any ash and catalyst fines present may also be removed in the char removal step.

After removal of the char, the hydropyrolysis product, together with the $H_2$, CO, $CO_2$, $H_2O$, and $C_1$-$C_3$ gases from the hydropyrolysis step, may, if further deoxygenation of the partially deoxygenated hydropyrolysis product is desired, be introduced into a hydroconversion reactor vessel and subjected to a hydroconversion step. The hydroconversion is preferably carried out at a temperature in the range of from 300° C. to 600° C. and a pressure in the range of from 0.50 MPa to 7.50 MPa. The weight hourly space velocity (WHSV) for this step is preferably in the range of about 0.1 $h^{-1}$ to about 2 $h^{-1}$.

According to some embodiments, only the hydropyrolysis step is practiced, in order to produce the partially deoxygenated hydropyrolysis product (e.g., as a condensed liquid), which, despite being "partially" deoxygenated, may nonetheless be deoxygenated to an extent sufficient for its use as a transportation fuel or a blending component of a transportation fuel. According to other embodiments, the partially deoxygenated hydropyrolysis product, by virtue of its high stability, for example being superior to conventional bio-oils, may be stored for an extended period (e.g., at least about 1 day or at least about 30 days) and/or may be transported to a remote location (e.g., transported at least about 5 miles or transported at least about 50 miles) for further processing, including being subjected to a hydroconversion step as described herein. Alternatively, partially deoxygenated hydropyrolysis product may be stored and/or transported as described above, for the purpose of further processing in a conventional refining process, such as hydrotreating, optionally in combination with a petroleum-derived fraction (e.g., a fraction comprising diesel boiling-range hydrocarbons derived from petroleum).

The hydroconversion catalyst composition used in this step is typically protected, at least to a substantial degree, from Na, K, Ca, P, and other metals present in the biomass entering the hydropyrolysis reactor vessel, which may otherwise poison the catalyst, since these metals become, to a substantial degree, physically incorporated within the solid char and ash products of the first hydropyrolysis stage, which are separated from the hydropyrolysis product, prior to subjecting this product to hydroconversion. This hydroconversion catalyst composition is therefore advantageously protected from olefins and free radicals by the upgrading achieved in the first hydropyrolysis step.

After the hydroconversion step, the vapour phase product of step c) is preferably condensed to provide a liquid phase product comprising substantially fully deoxygenated C4+ hydrocarbon liquid and aqueous material. The remaining vapour phase comprises mainly $H_2$, CO, $CO_2$ and light hydrocarbon gases (typically $C_1$ to $C_3$, but this stream may also contain some $C_4$ and $C_5$ hydrocarbons) and is separated.

This remaining vapour phase may be sent to a gas clean-up system to remove $H_2S$, ammonia and trace amounts of organic sulfur-containing compounds, if present as by-products of the process. The stream containing CO, $CO_2$, $H_2$ and light hydrocarbons may then be sent to a separation, reforming and water-gas shift section of the process, wherein hydrogen is produced from the light gases and may be re-used in the process. Preferably, this process provides enough hydrogen for use in the entire process of the invention. Renewable $CO_2$ is discharged as a by-product of the process.

The liquid phase product may then be separated in order to remove the aqueous material, suitably by phase separation, and to provide the substantially fully deoxygenated C4+ hydrocarbon liquid.

The term 'substantially fully deoxygenated' is used herein to describe material in which at least 90 wt %, preferably at least 95 wt %, more preferably at least 99 wt % of the oxygen present in the original biomass-containing and/or biomass-derived feedstock has been removed. The resulting hydrocarbon liquid contains less than 2 wt %, preferably less than 1 wt %, and most preferably less than 0.1 wt % oxygen.

Suitably, the substantially fully deoxygenated C4+ hydrocarbon liquid is then subjected to further separation and purification steps in order to provide desirable products.

In one embodiment of the invention, the substantially fully deoxygenated C4+ hydrocarbon liquid is subjected to distillation in order to separate the substantially fully deoxygenated C4+ hydrocarbon liquid into fractions according to ranges of the boiling points of the liquid products contained therein. A further hydrogenation step may then be applied to all or some of these fractions for further upgrading, for example if necessary to meet transportation fuel specifications, including the ASTM requirements and/or sulfur, oxygen, and/or nitrogen levels described below.

The substantially fully deoxygenated C4+ hydrocarbon liquid comprises naphtha range hydrocarbons, middle distillate range hydrocarbons and vacuum gasoil (VGO) range hydrocarbons, which can be separated by distillation. For the purpose of clarity, middle distillates here are defined as hydrocarbons or oxygenated hydrocarbons recovered by distillation between an atmospheric-equivalent initial boiling point (IBP) and a final boiling point (FBP) measured according to standard ASTM distillation methods. ASTM D86 initial boiling point of middle distillates may vary from 150° C. to 220° C. Final boiling point of middle distillates, according to ASTM D86 distillation, may vary from 350° C. to 380° C. Naphtha is defined as hydrocarbons or oxygenated hydrocarbons having four or more carbon atoms and having an atmospheric-equivalent final boiling point that is greater than 90° C. but less than 200° C. A small amount of hydrocarbons produced in the process (typically less than 10 wt % of total C4+ hydrocarbons, preferably less than 3 wt % of total C4+ hydrocarbons and most preferably less than 1 wt % of total C4+ hydrocarbons) boil at temperatures higher than those for the middle distillates as defined above, i.e. they are hydrocarbons with boiling range similar to vacuum-gas oil produced by distillation of petroleum.

Gasoline is an automotive fuel comprising predominantly of naphtha-range hydrocarbons, used in spark-ignition internal combustion engines. In the United States, ASTM D4814 standard establishes the requirements of gasoline for ground vehicles with spark-ignition internal combustion engines.

Diesel is an automotive fuel comprising predominantly of middle-distillate range hydrocarbons, used in compression-ignition internal combustion engines. In the United States, ASTM D975 standard covers the requirements of several grades of diesel fuel suitable for various types of diesel engines.

An advantage of the present invention is that under suitable operating conditions, the substantially fully deoxygenated C4+ hydrocarbon liquid produced from the biomass, biomass-containing and/or biomass-derived feedstock, optionally following a hydrogenation or other upgrading step, may be substantially fully free from oxygen, sulfur and nitrogen. Preferably, the oxygen content of this product is less than 1.50 wt % and more preferably less than 0.50 wt %, and most preferably less than 0.10 wt %. The sulfur content is preferably less than 100 ppmw, more preferably less than 10 ppmw, and most preferably less than 5 ppmw. The nitrogen content is preferably less than 1000 ppmw, more preferably to less than 100 ppmw and most preferably to less than 10 ppmw.

DETAILED DESCRIPTION OF THE DRAWINGS

In FIG. 1, a biomass, biomass-containing and/or biomass-derived feedstock (e.g., a solid biomass feedstock) 1 is contacted with a hydrogen-containing gaseous stream 2 in the presence of a hydropyrolysis catalyst composition in hydropyrolysis reactor vessel 3. The product 4 of this reactor is a mixed solid and vapour phase product containing hydrogen, light gases ($C_1$-$C_3$ hydrocarbons, CO, $CO_2$, $H_2S$, ammonia, water vapour), vapours of C4+ hydrocarbons and oxygenated hydrocarbons. Char, ash and catalyst fines are entrained with the vapour phase product. A solid separator 5 separates char, ash and catalyst fines 6 from the vapour phase product 7. The vapour phase product 7 then enters the catalytic hydroconversion reactor vessel 8. This reactor vessel is suitably a fixed bed reactor. The product 9 from this reactor vessel contains light gaseous hydrocarbons (methane, ethane, ethylene, propane, and propylene), naphtha range hydrocarbons, middle-distillate range hydrocarbons, hydrocarbons boiling above 370° C. (based on ASTM D86), hydrogen and by-products of the upgrading reaction such as $H_2O$, $H_2S$, $NH_3$, CO and $CO_2$. The vapours are condensed in one or more condensers followed by gas-liquid separators 10 downstream of the catalytic hydroconversion reactor 8 and a liquid product 19 is recovered.

Additionally, gas-liquid absorption in a packed bed or in a bubble column may be employed in section 10 to maximize the recovery in liquid form of hydrocarbons (predominantly C4-C5) in the gas phase. The liquid used in the absorber may comprise middle-distillate range hydrocarbons and vacuum gasoil range hydrocarbons produced in the distillation section 23.

The non-condensable gases 11 are sent to a gas clean-up system 12, comprising one or more process units, to remove an $H_2S$ stream 13 and ammonia stream 14 as by-products of the process. Organic sulfur containing compounds may be removed in the gas clean-up system as well. The stream containing light hydrocarbons 15 is sent to a separation, reforming and water-gas shift section 16 of the process, where hydrogen 17 is produced from the light gases and renewable $CO_2$ is discharged as a by-product of the process 18. A fuel gas stream may be recovered as a by-product from this section as well. The liquid product 19 recovered from the condensation and gas-liquid separation system 10 is sent to a product recovery section 20, where the aqueous product 21 is separated from the hydrocarbon liquid product 22. The hydrocarbon liquid product is then sent for distillation 23 to recover gasoline product 24 and a middle-distillate product 25. If desired, kerosene/jet fuel and diesel may be recovered as separate streams from the distillation tower.

In this process, either or both of the hydro-pyrolysis catalyst composition and the hydroconversion catalyst composition may be prepared by a process comprising the steps of incorporating one or more metals from groups 6, 9 and 10 into a shaped support; and incorporating one or more coordinating organic compounds into said shaped support, thus forming a catalyst precursor; and then either (i) treating the catalyst precursor in the presence of hydrogen and sulfiding it; or (ii) calcining the catalyst precursor.

Figure 2:
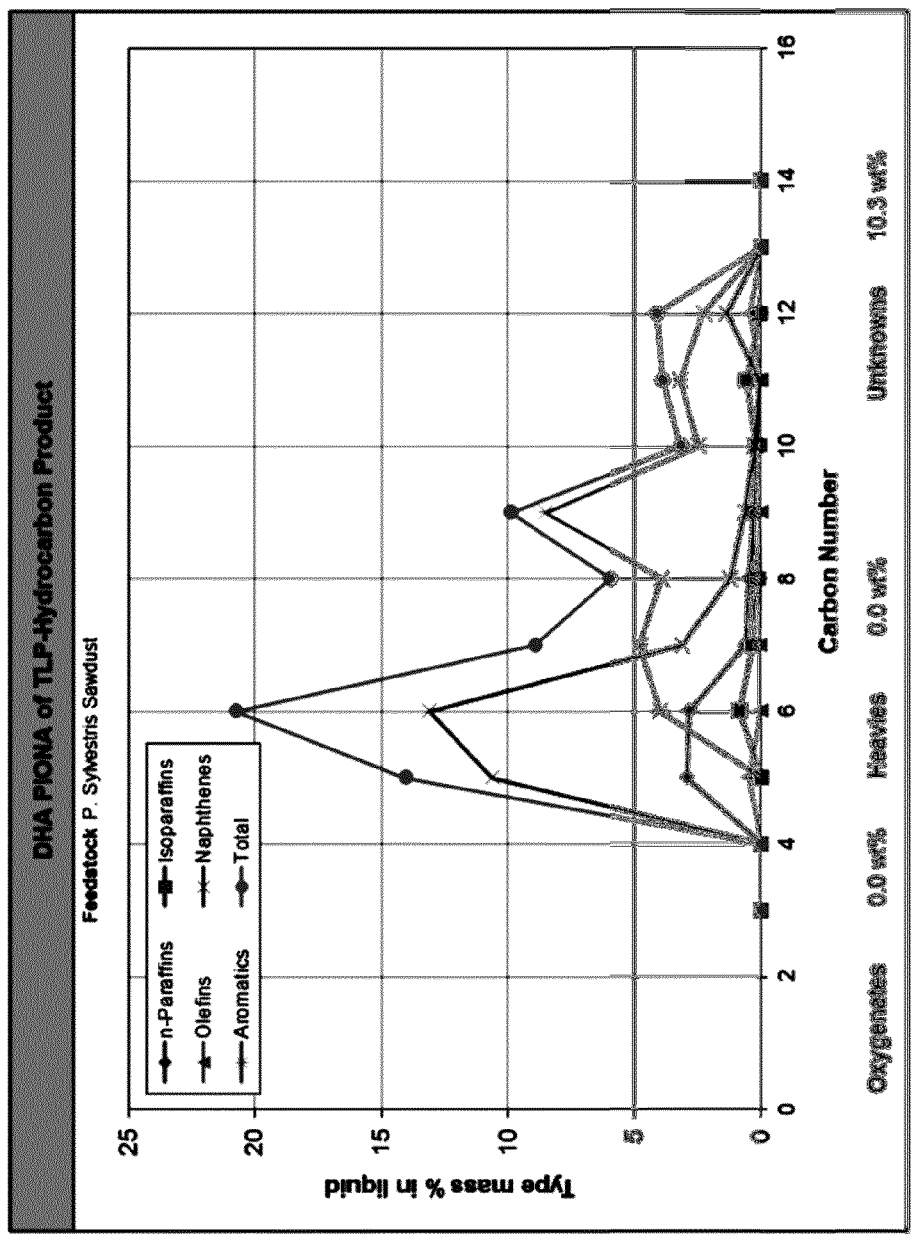
FIGS. 2 and 3 show the results of Example 1.
Figure 3:
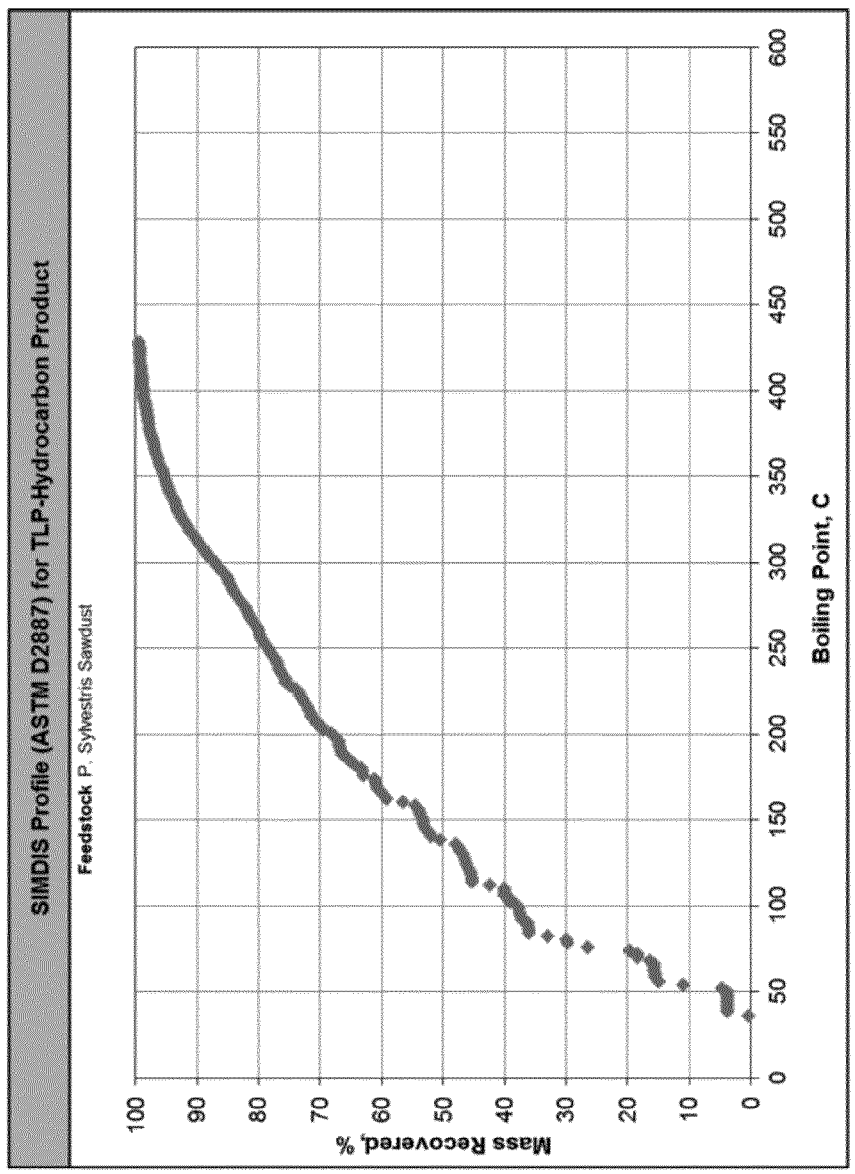
Figure 4:
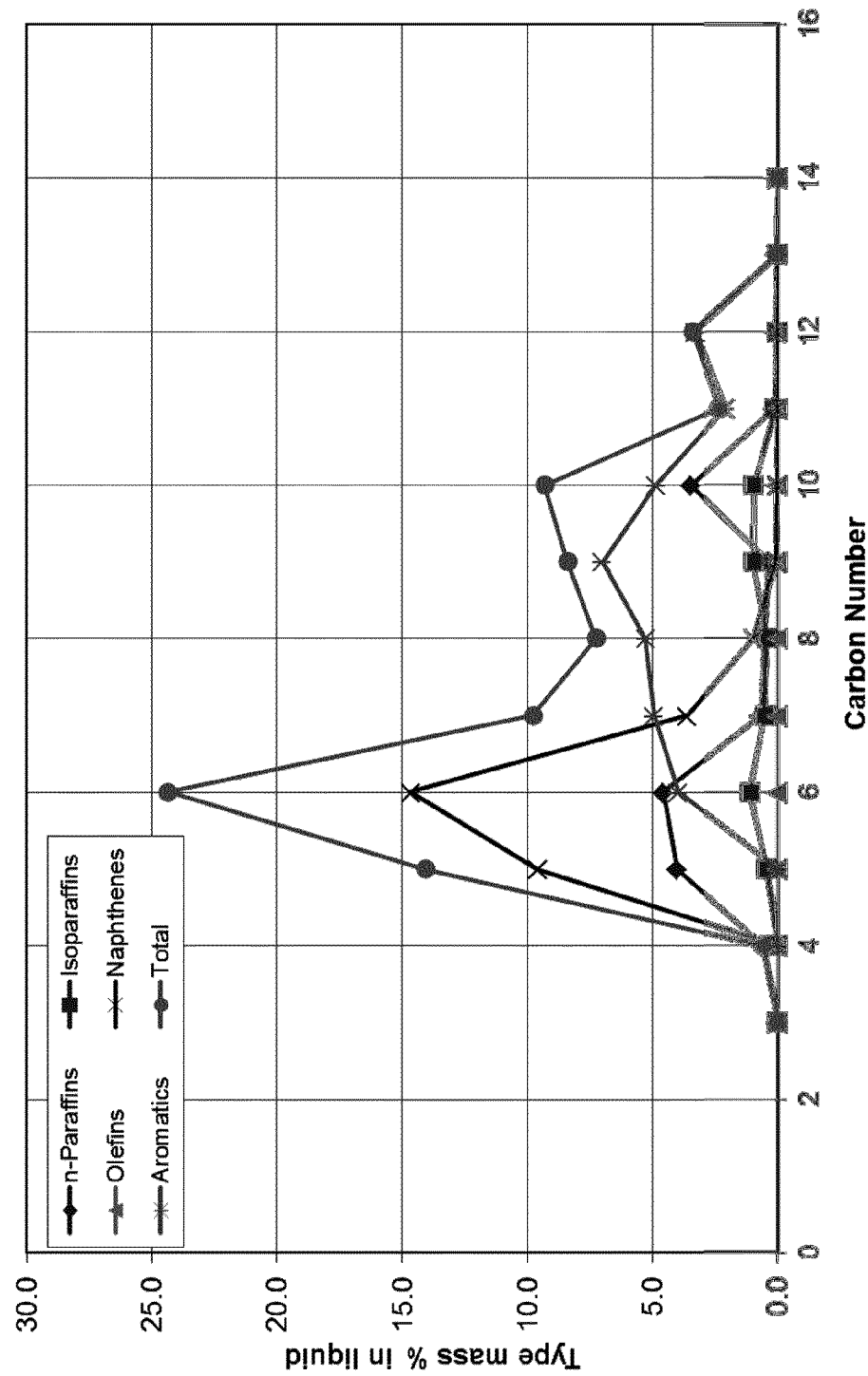
FIGS. 4 and 5 show the results of Example 2.
Figure 5:
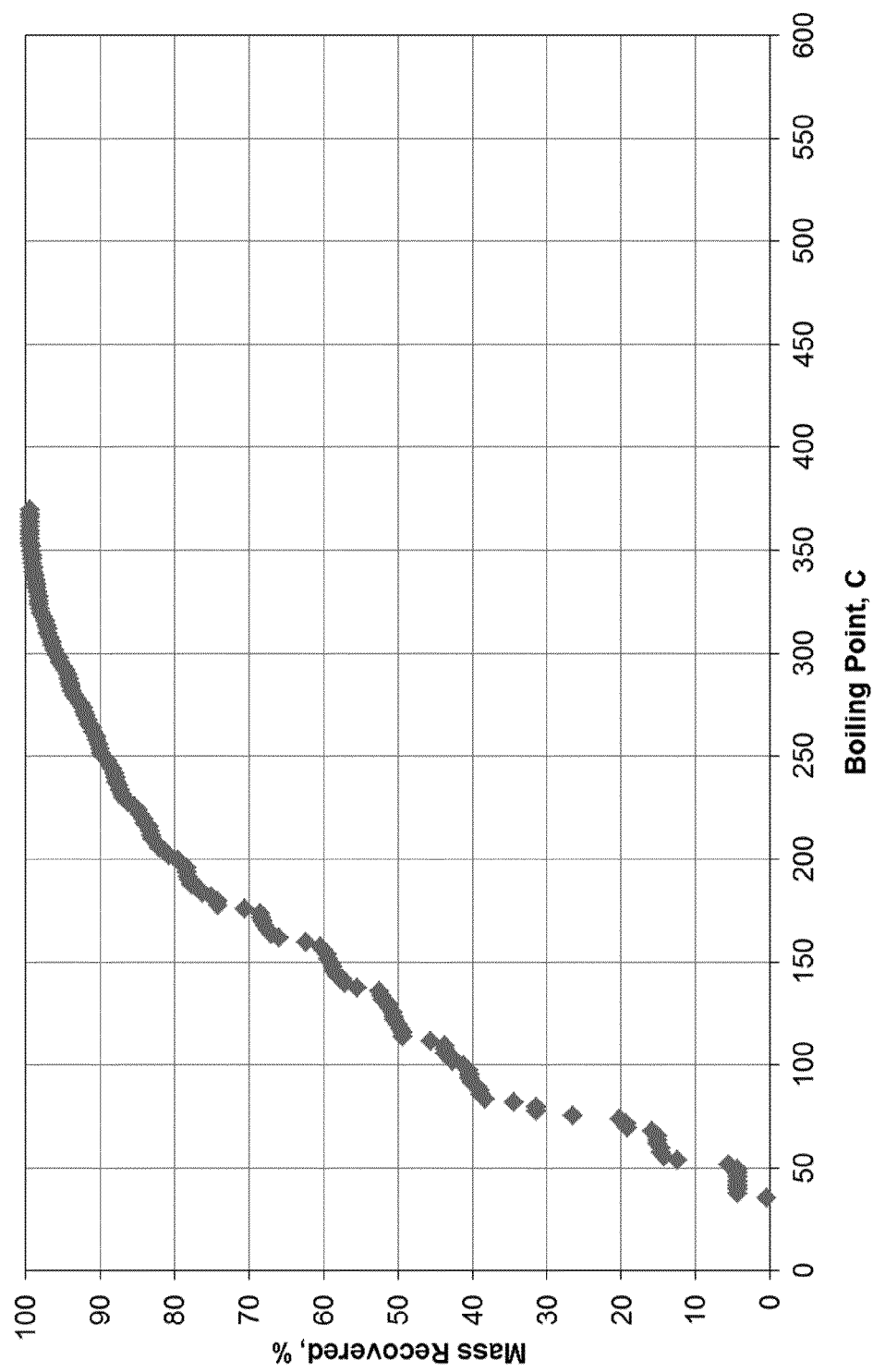
Figure 6:
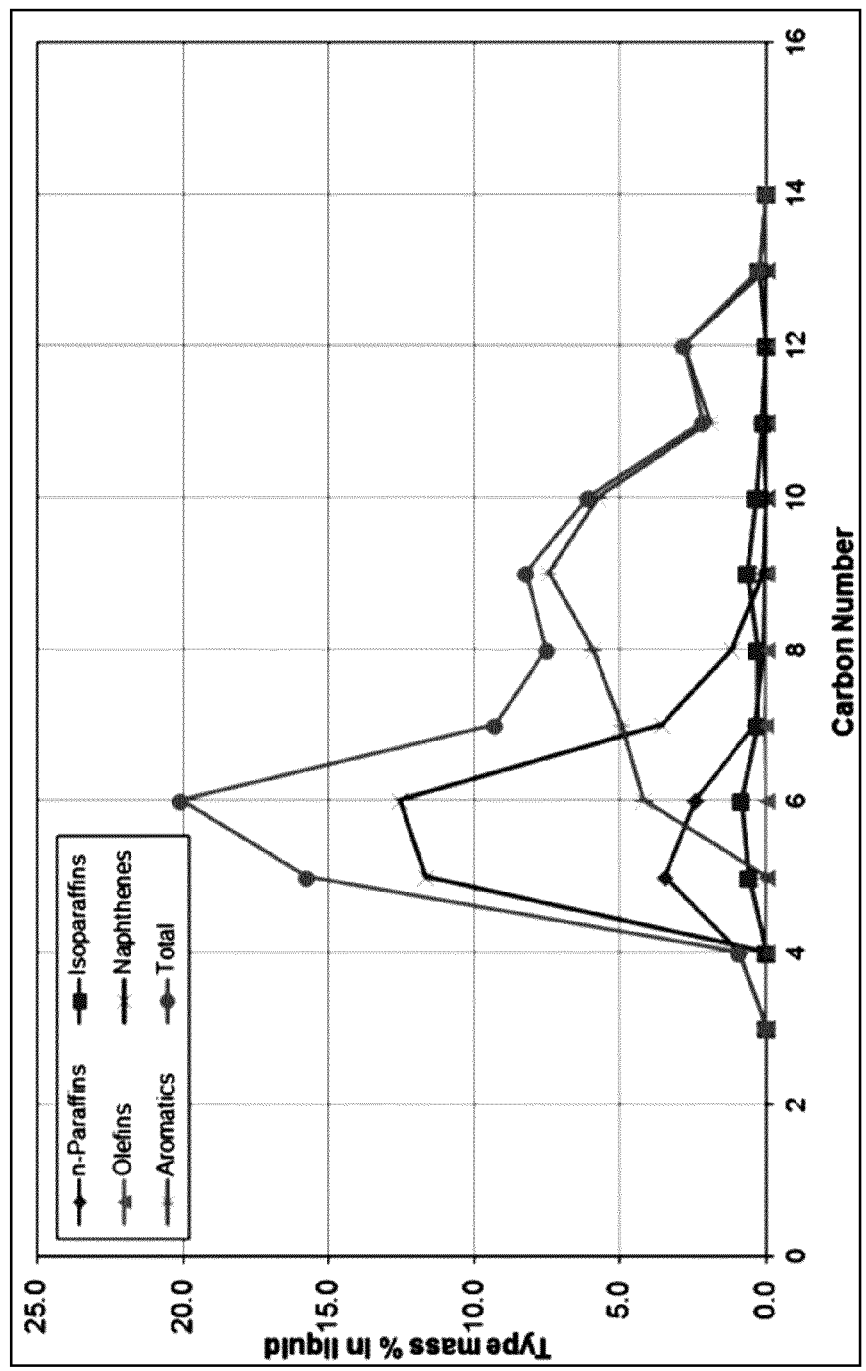
FIGS. 6 and 7 show the results of Example 3.
Figure 7:
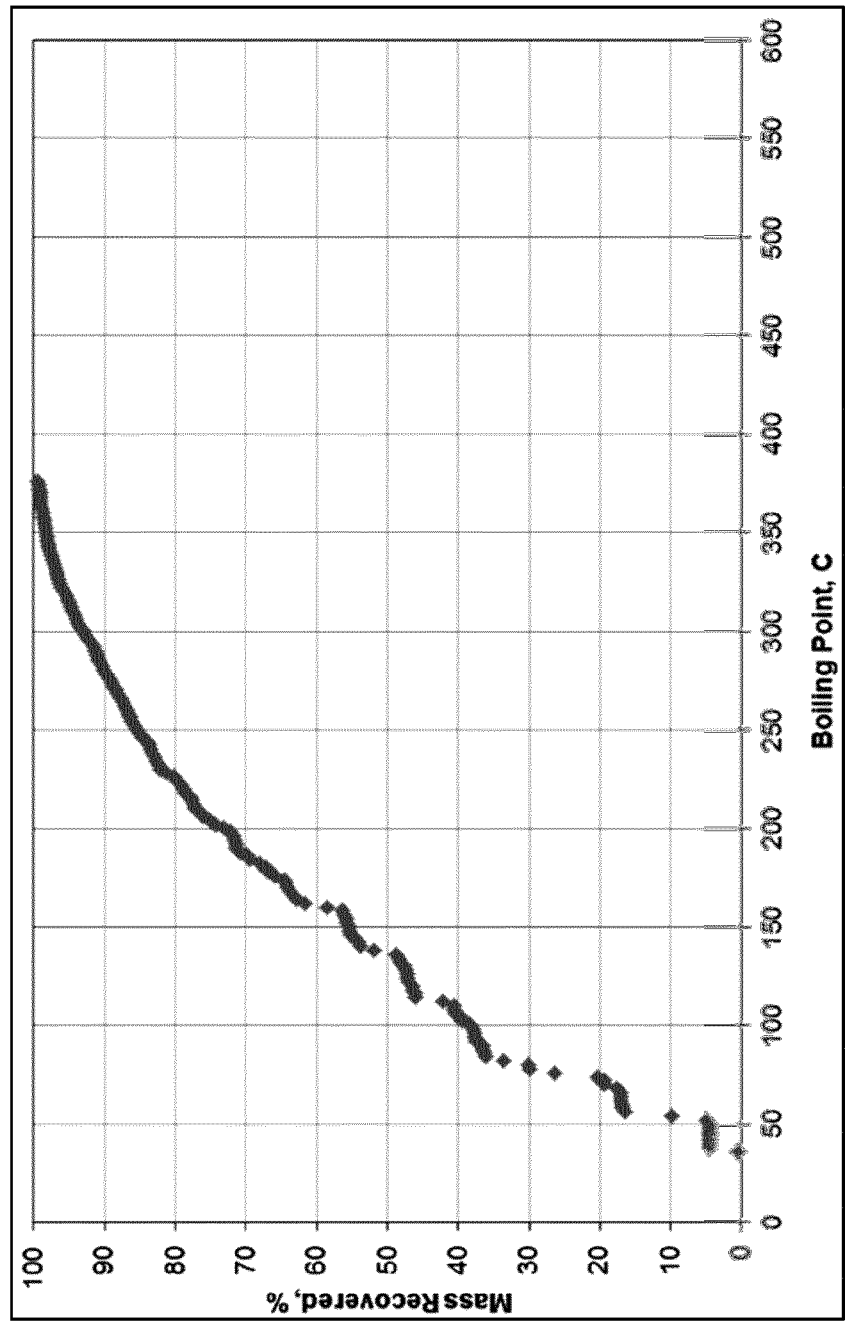

FIGS. 2 and 3 show the results of Example 1. FIGS. 4 and 5 show the results of Example 2. FIGS. 6 and 7 show the results of Example 3.

The invention will now be illustrated by means of the following Examples, which are not intended to limit the invention. The Examples are carried out according to the process shown in FIG. 1.

Example 1

When a catalyst is termed 'standard' in these examples, it has not been produced by a process comprising the steps of impregnating one or more metals from groups 6, 9 and 10 onto a shaped support; and impregnating the shaped support with one or more coordinating organic compounds, thus forming a catalyst precursor; and then either (i) treating the catalyst precursor in the presence of hydrogen and sulfiding it or (ii) calcining the catalyst precursor.

Example 1—Comparative

S-4211 catalyst (a 'standard' cobalt/molybdenum catalyst commercially available from CRI Catalyst Co) was crushed and sieved to a particle size range of 300 μm to 500 μm. The catalyst was subjected to an ex-situ sulfidation procedure to convert the cobalt and molybdenum metals to their sulfided forms. 210 g of this catalyst was used as the upgrading catalyst in the first, bubbling fluidized bed, hydropyrolysis reactor.

S-4212 catalyst (a 'standard' nickel/molybdenum catalyst commercially available from CRI Catalyst Co) was subjected to an in-situ sulfidation step to convert the nickel and molybdenum metals to their sulphide forms. In the second, fixed bed reactor, 705 g of sulfided S-4212 catalyst was loaded in the form of extrudates of nominally 1.3 mm diameter and approximately 3 mm to 6 mm length.

The solid feedstock used was sawdust of *Pinus sylvestris* ground and sieved to a particle size of less than 500 μm. Further feedstock details can be found in Table 1. The catalyst in the first, bubbling fluidized reactor was fluidized with a stream of hydrogen pre-heated to a temperature of approximately 435° C. After the first stage catalyst had been fluidized, the biomass was introduced into the reactor and processed in a continuous manner. The rate of processing of biomass was approximately 4.42 g/min on moisture and ash-free basis during the experiment. This feed rate corresponds to a weight hourly space velocity of approximately 1.26 kg biomass fed per kg catalyst per hour (on a moisture and ash-free basis). Over the duration of biomass processing, the weighted average temperature of the fluidized bed of catalyst was 443.7° C. The biomass feedstock was converted to a mixture of char, ash and vapours in the first, hydropyrolysis stage. The fluidization velocity was adjusted in such a way that the solid products (char, ash) and the vapour phase products were carried out of the reactor, while the catalyst remained in the reactor. Some catalyst was attrited into fines, and the fines were carried out of the bed as well.

The solid product was separated from the vapour phase product in a hot filtration set-up and the vapours were sent to the second stage fixed bed reactor. The average temperature of the second stage catalyst during the experiment was maintained at 410.5° C. The average weight hourly space velocity for the second stage was 0.38 kg biomass fed per kg catalyst per hour (on a moisture and ash-free basis). Operating pressure for both the first and the second stages was 2.2 MPa The vapour phase product of the second stage was cooled in stages to −41.8° C. and a two-layer liquid product containing a hydrocarbon layer floating on an aqueous layer was recovered. The hydrocarbon liquid was separated from the aqueous liquid, and was analysed. The off-gas from the process was sent to an online gas chromatogram, and the composition of the gas was analysed throughout the run. The mass balance and carbon balance of the process was calculated from the mass and analysis of the liquid products and compositional information of the gas product, based on which the yield profile was calculated.

It was found that the hydrocarbon liquid product had a very low oxygen content (essentially below the detection limit of the instrument of 0.01 wt %), and the aqueous product produced contained only 0.03 wt % carbon. Thus, complete hydrodeoxygenation of the biomass was achieved producing an oxygen-free hydrocarbon product, and a carbon-free aqueous phase. The total acid number of the hydrocarbon product was found to be very low, less than 0.1 mg KOH/g.

The hydrocarbon and aqueous phases were subjected to further analysis. The detailed hydrocarbon analysis (DHA) of the hydrocarbon product (FIG. 2) showed this product to be comprising predominantly of cyclic species. Among the cyclic species, naphthenes were found to dominate in the low carbon number range (carbon numbers of 7 and lower), while aromatics dominated at higher carbon number range (carbon numbers of 8 and above). Paraffins and isoparaffins were present mainly in the low carbon number molecules (carbon numbers of 7 and lower). 6-carbon molecules were the most abundant molecules in the liquid product.

SIMDIS of the hydrocarbon product (FIG. 3) showed the product to be boiling predominantly in the gasoline and diesel range, with essentially no heavy hydrocarbons (boiling above 370° C.) produced. The yield of C4+ hydrocarbons (hydrocarbons in the product having 4 or more carbon atoms) in this Example was found to be 26.6 wt % of the feedstock weight on a moisture and ash-free basis. The yield structure of the other products is mentioned in Table 2.

The aromatic content of the total liquid product (TLP) was also measured using IP-391 analytical method. This method showed the product to contain about 53.6 wt % aromatics, with the contribution of monoaromatics at 41.4 wt % of the total liquid, that of diaromatics at 7.4 wt % of the total liquid, and that of tri+ aromatics at 4.8 wt % of the total liquid.

Example 2—Inventive

Catalyst Preparation Procedure

A commercially available alumina carrier was used in the preparation of the catalyst composition used in this Example.

The metal components of the catalyst were incorporated into the carrier by the incipient wetness impregnation technique to yield the following metals composition (oxide basis): 14.8% Mo, 4.2% Co, 2.4% P.

The metal-incorporated support material was then dried at 125° C. for a period of several hours. The dried intermediate was then impregnated with propylene carbonate to fill 95% of the pore volume of the dried intermediate: 100% of propylene carbonate (Sigma Aldrich) yielding Catalyst A.

This catalyst was ground and sieved to a particle size range of 300 μm to 500 μm. About 151.6 g of this catalyst was used as the 1$^{st}$ upgrading catalyst in a bubbling fluidized bed reactor after ex-situ sulfidation. S-4232 catalyst (a 'standard' cobalt/molybdenum catalyst commercially available from CRI Catalyst Co), was dried and used as the 2$^{nd}$ upgrading catalyst in the second, fixed bed reactor in the form of extrudates of 1.3 mm diameter and approximately 3 mm to 6 mm length. About 750 g of S-4232 catalyst was charged in the fixed bed reactor.

Catalyst Activation by Sulfidation

Prior to loading into the reactor, the 1$^{st}$ upgrading catalyst was subjected to an ex-situ sulfidation step. The ex-situ sulfidation step is designed to convert the molybdenum on the catalyst to a sulfide phase. For ex-situ sulfidation, the as-is catalyst, without any drying, was loaded in a fixed bed reactor. The reactor was then pressurized with hydrogen to a pressure of approximately 3.5 MPa (gauge). A hydrogen flow of approximately 195 Nm$^3$/m$^3$ of catalyst was established. The temperature was ramped from ambient temperature to 150° C. with a ramp rate of 25° C./hr and was held at 150° C. for a minimum of 12 hours. A hydrocarbon feed spiked with a sulfur spiking agent (DMDS, dimethyl disulfide) to a total sulfur content of 2.5 wt %, was used as the sulfidation feed. The sulfidation feed was introduced into the reactor with a liquid hourly space velocity of 1.5 litresers feed per litre catalyst per hour. Once the feed broke through the reactor, temperature was ramped up from 150° C. to 320° C. with a ramp rate of 25° C./hour. The hydrogen and sulfidation feed flows were maintained at 320° C. for a minimum of 4 hours. The reactor was then cooled down to 205° C. with a ramp rate of about 50° C./hr while maintaining the sulfidation feed and hydrogen flow. After cooling down to ~205° C., the sulfidation feed was cut off, however hydrogen flow was maintained. To ensure complete drying of the catalyst before using it for biomass processing, it was dried in-situ under flowing hydrogen while monitoring the concentration of hydrocarbons in the off gas. Only after the concentration of hydrocarbons in the off gas was reduced to <0.003 mol %, the catalyst was deemed to be dry i.e. not contain any free hydrocarbon that can interfere with mass balance closure during biomass feedstock processing.

Biomass Processing

The ex-situ sulfided catalyst was used as the first upgrading catalyst. The biomass feedstock used was Pine sawdust ground and sieved to a particle size range of 250 μm to 500 μm. Further feedstock details can be found in Table 1. The catalyst in the 1st bubbling fluidized reactor was fluidized with a stream of hydrogen pre-heated to a temperature of approximately 435° C. After the 1$^{st}$ stage catalyst had been fluidized, the biomass was introduced into the reactor and processed in a continuous manner. The rate of processing of biomass was gradually ramped up to the target rate of 4.3 g/min, corresponding to a weight hourly space velocity of the biomass feedstock to the 1$^{st}$ stage reactor of approximately 1.54 kg biomass per kg catalyst per hour on a moisture and ash-free basis. The weighted average temperature of the fluidized bed of catalyst was 437.1° C. over the duration of biomass processing. The biomass feedstock was converted to a mixture of char, ash and vapours in the 1st stage. The fluidization velocity was adjusted in such a way that the solid products (char, ash) and the vapour phase products were carried out of the reactor, while the catalyst remained in the reactor. Some catalyst was attrited into fines, and the fines were carried out of the bed as well.

The solid product was separated from the vapour phase product in a filter and the vapours were sent to the 2$^{nd}$ stage, fixed bed reactor. The average temperature of the 2$^{nd}$ stage catalyst was maintained at 408.3° C. The biomass feedstock processing rate was gradually ramped up to the final WHSV to the 2$^{nd}$ stage of 0.31 kg biomass per kg catalyst per hour on a moisture and ash-free basis. Operating pressure for both 1$^{st}$ and 2$^{nd}$ stage was 2.2 MPa.

The vapour phase product of 2$^{nd}$ stage reactor was cooled in stages to −42° C. and a two-layer liquid product containing a hydrocarbon layer floating on an aqueous layer was recovered. The hydrocarbon liquid was separated from the aqueous liquid, and was analysed. The off gas from the process was sent to an online GC, and composition of the gas was analysed throughout the run. The mass balance and carbon balance of the process was calculated from the mass and analysis of the liquid products and compositional information of the gas product, based on which the yield profile was calculated. It was found that the hydrocarbon liquid product had a very low oxygen content (below 0.01 wt %), and the aqueous product produced was found to contain only 0.03 wt % carbon. Thus, essentially complete hydrodeoxygenation of the biomass was achieved producing an oxygen-free hydrocarbon product, and a carbon-free aqueous phase. The total acid number of the hydrocarbon product was found to be very low at 0.023 mg KOH/g.

The hydrocarbon and aqueous phases were subjected to further analysis. The detailed hydrocarbon analysis (DHA) of the hydrocarbon product (FIG. 4) showed this product to be comprised isoparaffins, naphthenes and aromatics. 6-carbon molecules were the most abundant molecules in the liquid product. SIMDIS of the hydrocarbon product (FIG. 5) showed the product to be boiling predominantly in the gasoline and diesel range, with essentially no heavy hydrocarbons (boiling above 370° C.) produced. The yield of C4+ hydrocarbons (hydrocarbons in the product having 4 or more carbon atoms) in this Example was found to be 24.4 wt % of the feedstock weight on a moisture and ash-free basis. The yield structure of the other products is mentioned in Table 2.

Example 3—Inventive

Catalyst Preparation Procedure

In this embodiment of the invention, S-4211 catalyst, (a 'standard' cobalt/molybdenum catalyst commercially available from CRI Catalyst Company, was used as the 1st upgrading catalyst in the bubbling fluidized bed hydropyrolysis reactor. Catalyst B was used as the 2nd upgrading catalyst in the fixed bed reactor. Catalyst B was prepared as follows.

A commercially available alumina carrier was used in the preparation of the catalyst composition used in this Example.

The metal components of the catalyst were incorporated into the carrier by the incipient wetness impregnation technique to yield the following metals composition (oxide basis): 14.8% Mo, 4.2% Co, 2.4% P. Malic acid (Sigma Aldrich) was added to impregnation solution. The metal-incorporated support material was then dried at 125° C. for a period of several hours to yield catalyst B.

Catalyst B was used in the so-called 'oxidic' form in this Example. To convert the catalyst to oxidic form, it was subjected to a calcination step in air at a minimum temperature of 400° C. for a minimum of 4 hours. This catalyst was used as the 2$^{nd}$ upgrading catalyst in the second, fixed bed reactor in the form of extrudates of 1.3 mm diameter and approximately 3 mm to 6 mm length. About 700 g of S-4252 catalyst was charged in the fixed bed reactor.

1$^{st}$ Stage Catalyst Sulfidation

S-4211 catalyst was ground and sieved to a particle size range of 300 µm to 500 µm. Prior to loading into the reactor, the 1$^{st}$ upgrading catalyst was subjected to an ex-situ sulfidation step. The ex-situ sulfidation step is designed to convert the molybdenum on the catalyst to a sulfide phase. For ex-situ sulfidation, the as-is catalyst, without any drying, was loaded in a fixed bed reactor. The reactor was then pressurized with hydrogen to a pressure of approximately 3.5 MPa (gauge). A hydrogen flow of approximately 195 Nm$^3$/m$^3$ of catalyst was established. The temperature was ramped from ambient temperature to 150° C. with a ramp rate of 25° C./hr and was held at 150° C. for a minimum of 12 hours. A hydrocarbon feed spiked with a sulfur spiking agent (DMDS, dimethyl disulfide) to a total sulfur content of 2.5 wt %, was used as the sulfidation feed. The sulfidation feed was introduced into the reactor with a liquid hourly space velocity of 1.5 litres feed per litre catalyst per hour. Once the feed broke through the reactor, temperature was ramped up from 150° C. to 320° C. with a ramp rate of 25° C./hour. The hydrogen and sulfidation feed flows were maintained at 320° C. for a minimum of 4 hours. The reactor was then cooled down to 205° C. with a ramp rate of about 50° C./hr while maintaining the sulfidation feed and hydrogen flow. After cooling down to ~205° C., the sulfidation feed was cut off, however hydrogen flow was maintained. To ensure complete drying of the catalyst before using it for biomass processing, it was dried in-situ under flowing hydrogen while monitoring the concentration of hydrocarbons in the off gas. Only after the concentration of hydrocarbons in the off gas was reduced to <0.003 mol % mol %, the catalyst was deemed to be dry i.e. not contain any free hydrocarbon that can interfere with mass balance closure during biomass processing.

Biomass Processing

The biomass feedstock used was *Pinus radiata* sawdust ground and sieved to a particle size range of 250 µm to 500 µm. Further feedstock details can be found in Table 1. The catalyst in the 1$^{st}$ bubbling fluidized reactor was fluidized with a stream of hydrogen pre-heated to a temperature of approximately 435° C. After the 1$^{st}$ stage catalyst had been fluidized, the biomass was introduced into the reactor and processed in a continuous manner. The rate of processing of biomass was gradually ramped up to the target rate of 5.6 g/min, corresponding to a weight hourly space velocity of the biomass feedstock to the 1$^{st}$ stage reactor of approximately 1.62 kg biomass per kg catalyst per hour on a moisture and ash-free basis. The weighted average temperature of the fluidized bed of catalyst was 441.3° C., over the duration of biomass processing. The biomass feedstock was converted to a mixture of char, ash and vapours in the 1$^{st}$ stage. The fluidization velocity was adjusted in such a way that the solid products (char, ash) and the vapour phase products were carried out of the reactor, while the catalyst remained in the reactor. Some catalyst was attrited into fines, and the fines were carried out of the bed as well.

The solid product was separated from the vapour phase product in a filter and the vapours were sent to the 2$^{nd}$ stage, fixed bed reactor. The average temperature of the 2$^{nd}$ stage catalyst was maintained at 397.3° C. The biomass feedstock processing rate was gradually ramped up to the final WHSV to the 2$^{nd}$ stage of 0.46 kg biomass per kg catalyst per hour on a moisture and ash-free basis. Operating pressure for both 1$^{st}$ and 2$^{nd}$ stage was 2.26 MPa (gauge).

The vapour phase product of 2$^{nd}$ stage reactor was cooled in stages to −45° C. and a two-layer liquid product containing a hydrocarbon layer floating on an aqueous layer was recovered. The hydrocarbon liquid was separated from the aqueous liquid, and was analysed. The off gas from the process was sent to an online GC, and composition of the gas was analysed throughout the run. The mass balance and carbon balance of the process was calculated from the mass and analysis of the liquid products and compositional information of the gas product, based on which the yield profile was calculated. It was found that the hydrocarbon liquid product had a very low oxygen content (below 0.01 wt %), and the aqueous product produced was found to contain only 0.02 wt % carbon. Thus, essentially complete hydrodeoxygenation of the biomass was achieved producing an oxygen-free hydrocarbon product, and a carbon-free aqueous phase. The total acid number of the hydrocarbon product was found to be very low at <0.01 mg KOH/g.

The hydrocarbon and aqueous phases were subjected to further analysis. The detailed hydrocarbon analysis (DHA) of the hydrocarbon product (FIG. 5) showed this product to be comprised isoparaffins, naphthenes and aromatics. 6-carbon molecules were the most abundant molecules in the liquid product. SIMDIS of the hydrocarbon product (FIG. 6) showed the product to be boiling predominantly in the gasoline and diesel range, with essentially no heavy hydrocarbons (boiling above 370° C.) produced. The yield of C4+ hydrocarbons (hydrocarbons in the product having 4 or more carbon atoms) in this Example was found to be 24.2 wt % of the feedstock weight on a moisture and ash-free basis. The yield structure of the other products is mentioned in Table 2.

TABLE 1

| Feedstock | | | |
|---|---|---|---|
| | Example 1 | Example 2 | Example 3 |
| Total weight of feedstock processed, g | 784.1 | 913.1 | 935.7 |
| Duration of feedstock processing, min | 177.5 | 220 | 180 |
| Feedstock Analysis | | | |
| Moisture, wt % | 6.51 | 6.44 | 2.87 |
| Ash, wt % (dry basis) | 0.34 | 0.12 | 0.42 |
| Elemental Analysis (MAF Basis)[1] | | | |
| Carbon, wt % | 47.2 | 47.18 | 47.35 |
| Hydrogen, wt % | 6.5 | 6.53 | 6.61 |
| Oxygen, wt % | 46.2 | 46.23 | 45.90 |
| Sulfur, wt % | 0.03 | 0.03 | 0.093 |
| Nitrogen, wt % | 0.027 | 0.03 | 0.049 |
| Feedstock H:C Atomic ratio | 1.64 | 1.65 | 1.66 |

[1]MAF = moisture and ash free basis

TABLE 2

| Products | Example 1 | Example 2 | Example 3 |
|---|---|---|---|
| *Yield Details* | | | |
| C4+ Hydrocarbon Yield (wt %, MAF[1]) | 26.6 | 24.4 | 24.2 |
| C1-C3 Hydrocarbon Yield (wt %, MAF) | 15.1 | 16.4 | 20.4 |
| CO Yield (wt %, MAF) | 7.4 | 3.0 | 3.8 |
| $CO_2$ Yield (wt %, MAF) | 4.0 | 1.3 | 3.4 |
| Char & Ash Yield (wt %, MAF) | 8.6 | 11.5 | 11.1 |
| Water Yield (wt %, MAF) | 36.3 | 42.5 | 44.9 |
| Hydrogen added (wt %, MAF) | 4.35 | 5.48 | 6.35 |
| *Condensed Hydrocarbon Liquid Analysis* | | | |
| Oxygen Content (wt %) | BDL (<0.01) | BDL (<0.01) | BDL (<0.01) |
| Carbon content (wt %) | 88.76 | 87.89 | 88.90 |
| Hydrogen content (wt %) | 11.43 | 12.18 | 11.41 |
| Density (g/mL, at 15° C.) | 0.8365 | 0.8099 | 0.8319 |
| Gasoline[2] in C4+ hydrocarbon (%) | 69 | 76 | 73 |
| Diesel[3] in C4+ hydrocarbon (%) | 31 | 24 | 27 |
| Total Acid Number (TAN) | <0.01 | 0.023 | <0.01 |
| H/C Atomic Ratio | 1.55 | 1.64 | 1.53 |
| *C1-C3 Gas Composition* | | | |
| Methane (wt %) | 25.5 | 68.1 | 37.6 |
| Ethane (wt %) | 44.1 | 16.1 | 37.0 |
| Propane (wt %) | 30.4 | 15.8 | 25.4 |
| *Water Analysis* | | | |
| pH | 9.2 | 8.0 | 8.7 |
| Density (g/mL, at 15° C.) | 1.0006 | 1.0001 | 0.9999 |
| Carbon Content (wt %) | 0.03 | 0.03 | 0.02 |

[1] MAF = moisture and ash free basis
[2] Gasoline is defined here as containing hydrocarbons having between 4 and 10 carbon atoms
[3] Diesel is defined here as containing hydrocarbons with 11 or more carbon atoms.

That which is claimed is:

1. A process for producing liquid hydrocarbon products from a biomass, biomass-containing and/or biomass-derived feedstock, the process comprising the steps of:
   a) contacting the feedstock with one or more hydropyrolysis catalyst compositions and molecular hydrogen in a hydropyrolysis reactor vessel at a temperature in the range of from 350 to 600° C. and a pressure in the range of from 0.50 to 7.50 MPa, to produce a product stream comprising hydropyrolysis product that is at least partially deoxygenated, $H_2O$, $H_2$, $CO_2$, CO, $C_1$-$C_3$ gases, char and catalyst fines;
   b) removing all or a portion of the char and catalyst fines from the product stream;
   c) hydroconverting all or a portion of the hydropyrolysis product in a hydroconversion reactor vessel in the presence of one or more hydroconversion catalyst compositions and of at least a portion of the $H_2O$, $CO_2$, CO, $H_2$, and $C_1$-$C_3$ gases generated in step a), to produce a vapour phase product comprising substantially fully deoxygenated hydrocarbon product, $H_2O$, CO, $CO_2$, and $C_1$-$C_3$ gases,
   wherein one or both of the hydropyrolysis catalyst composition and the hydroconversion catalyst composition is an organics-treated catalyst composition comprising one or more metals selected from those of groups 6, 9, and 10 of the periodic table, and one or more coordinating organic compounds, wherein the one or more coordinating compounds are selected from the group of amide compounds, carbonates, long chain amines, organic acids and alpha olefins; and wherein a catalyst precursor to the organics-treated catalyst composition was either (i) subjected to a hydrogen treatment step and sulfidation or (ii) calcined.

2. The process according to claim 1, wherein the catalyst precursor is subjected to a hydrogen treatment step comprising exposing the catalyst precursor to hydrogen gas at a temperature in the range of from 100° C. to 225° C.

3. The process according to claim 1, wherein the sulfidation is carried out after the catalyst precursor has been subjected to the hydrogen treatment step for a period of time and the hydrogen treatment step continues during sulfidation.

4. The process according to claim 1, wherein the catalyst precursor is dried at a temperature in the range of from 100 to 150° C. and then calcined at a temperature in the range of from 450 to 520° C. in the presence of air or oxygen.

5. The process according to claim 1, wherein the one or more metals selected from groups 6, 9, and 10 are selected from molybdenum, tungsten, cobalt, nickel, and mixtures thereof.

6. The process according to claim 1, wherein the biomass-containing and/or biomass-derived feedstock comprises a solid selected from the group consisting of lignocellulose, waste plastics, municipal solid waste food waste, cellulosic feedstocks, aquaculture products and combinations thereof.

7. The process according to claim 6, wherein the solid is municipal solid waste containing lignocellulosic material and the biomass-containing or biomass-derived feedstock further comprises a material selected from one or more of woody biomass and agricultural and forestry products and residues thereof.

8. The process according to claim 1, further comprising condensing the vapour phase product of step c) to provide a liquid phase product comprising substantially fully deoxygenated C4+ hydrocarbon liquid and aqueous material and separating said liquid phase product from a gas phase product comprising $H_2$, CO, $CO_2$, and $C_1$-$C_3$ gases.

9. The process according to claim 8, wherein the gas phase product comprising $H_2$, CO, $CO_2$, and $C_1$-$C_3$ gases are subjected to a reforming and water-gas shift process in order to produce hydrogen.

10. The process according to claim 9, wherein the gas phase product is first purified to remove any $H_2S$, organic sulfur compounds and $NH_3$ present before being subjected to the reforming and water-gas shift process.

11. The process according to claim 9, wherein the hydrogen produced in the reforming and water-gas shift process is used as at least a portion of the molecular hydrogen in step a) or is added to the process in step c).

12. A process for producing liquid hydrocarbon products from a biomass, biomass-containing and/or biomass-derived feedstock, the process comprising the steps of:
   a) contacting the feedstock with one or more hydropyrolysis catalyst compositions and molecular hydrogen in a hydropyrolysis reactor vessel at a temperature in the range of from 350 to 600° C. and a pressure in the range of from 0.50 to 7.50 MPa, to produce a product stream comprising hydropyrolysis product that is at least partially deoxygenated, $H_2O$, $H_2$, $CO_2$, CO, $C_1$-$C_3$ gases, char and catalyst fines;

b) removing all or a portion of the char and catalyst fines from the product stream;

c) hydroconverting all or a portion of the hydropyrolysis product in a hydroconversion reactor vessel in the presence of one or more hydroconversion catalyst compositions and of at least a portion of the $H_2O$, $CO_2$, CO, $H_2$, and $C_1$-$C_3$ gases generated in step a), to produce a vapour phase product comprising substantially fully deoxygenated hydrocarbon product, $H_2O$, CO, $CO_2$, and $C_1$-$C_3$ gases, wherein at least one of the one or more hydropyrolysis catalyst compositions is an organics-treated catalyst composition comprising one or more metals selected from those of groups 6, 9, and 10 of the periodic table, and one or more coordinating organic compounds, wherein the one or more coordinating organic compounds are selected from the group of amide compounds, carbonates, long chain amines, organic acids and alpha olefins; and wherein a catalyst precursor to the organics-treated catalyst composition was either (i) subjected to a hydrogen treatment step and sulfidation or (ii) calcined.

13. The process according to claim 12, wherein at least one of the one or more hydroconversion catalyst compositions is an organics-treated catalyst composition comprising one or more metals selected from those of groups 6, 9, and 10 of the periodic table, and one or more coordinating organic compounds; and wherein a catalyst precursor to the organics-treated catalyst composition was either (i) subjected to a hydrogen treatment step and sulfidation or (ii) calcined.

14. The process according to claim 12, wherein the one or more metals selected from groups 6, 9, and 10 are selected from molybdenum, tungsten, cobalt, nickel, and mixtures thereof.

15. The process according to claim 12, further comprising condensing the vapour phase product of step c) to provide a liquid phase product comprising substantially fully deoxygenated C4+ hydrocarbon liquid and aqueous material and separating said liquid phase product from a gas phase product comprising $H_2$, CO, $CO_2$, and $C_1$-$C_3$ gases.

16. The process according to claim 15, wherein the gas phase product comprising $H_2$, CO, $CO_2$, and $C_1$-$C_3$ gases are subjected to a reforming and water-gas shift process in order to produce hydrogen.

17. A process for producing liquid hydrocarbon products from a biomass, biomass-containing and/or biomass-derived feedstock, the process comprising the steps of:

a) contacting the feedstock with one or more hydropyrolysis catalyst compositions and molecular hydrogen in a hydropyrolysis reactor vessel at a temperature in the range of from 350 to 600° C. and a pressure in the range of from 0.50 to 7.50 MPa, to produce a product stream comprising hydropyrolysis product that is at least partially deoxygenated, $H_2O$, $H_2$, $CO_2$, CO, $C_1$-$C_3$ gases, char and catalyst fines;

b) removing all or a portion of the char and catalyst fines from the product stream;

c) hydroconverting all or a portion of the hydropyrolysis product in a hydroconversion reactor vessel in the presence of one or more hydroconversion catalyst compositions and of at least a portion of the $H_2O$, $CO_2$, CO, $H_2$, and $C_1$-$C_3$ gases generated in step a), to produce a vapour phase product comprising substantially fully deoxygenated hydrocarbon product, $H_2O$, CO, $CO_2$, and $C_1$-$C_3$ gases, wherein at least one of the one or more hydroconversion catalyst compositions is an organics-treated catalyst composition comprising one or more metals selected from those of groups 6, 9, and 10 of the periodic table, and one or more coordinating organic compounds, wherein the one or more coordinating organic compounds are selected from the group of amide compounds, carbonates, long chain amines, organic acids and alpha olefins; and wherein a catalyst precursor to the organics-treated catalyst composition was either (i) subjected to a hydrogen treatment step and sulfidation or (ii) calcined.

18. The process according to claim 17, wherein at least one of the one or more hydropyrolysis catalyst compositions is an organics-treated catalyst composition comprising one or more metals selected from those of groups 6, 9, and 10 of the periodic table, and one or more coordinating organic compounds; and wherein a catalyst precursor to the organics-treated catalyst composition was either (i) subjected to a hydrogen treatment step and sulfidation or (ii) calcined.

19. The process according to claim 17, wherein the one or more metals selected from groups 6, 9, and 10 are selected from molybdenum, tungsten, cobalt, nickel, and mixtures thereof.

* * * * *